(12) United States Patent
Yoscovich et al.

(10) Patent No.: US 11,669,119 B2
(45) Date of Patent: Jun. 6, 2023

(54) SYSTEM AND METHOD FOR SUPPLYING POWER FROM A POWER SYSTEM

(71) Applicant: Solaredge Technologies Ltd., Herzeliya (IL)

(72) Inventors: Ilan Yoscovich, Ramat Gan (IL); Meir Gazit, Ashkelon (IL); Yoav Galin, Raanana (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 16/818,004

(22) Filed: Mar. 13, 2020

(65) Prior Publication Data

US 2020/0286190 A1 Sep. 10, 2020

Related U.S. Application Data

(63) Continuation of application No. 15/861,748, filed on Jan. 4, 2018, now Pat. No. 10,628,897.
(Continued)

(51) Int. Cl.
*G05F 1/67* (2006.01)
*G06Q 50/06* (2012.01)
(Continued)

(52) U.S. Cl.
CPC ............... *G05F 1/67* (2013.01); *G06Q 50/06* (2013.01); *H02J 3/06* (2013.01); *H02J 3/38* (2013.01);
(Continued)

(58) Field of Classification Search
CPC .... G05F 1/67; G06Q 50/06; H02J 3/06; H02J 3/38; H02J 3/383; H02J 3/385; H02J 3/386; H02J 7/35; H02J 9/062; H02J 13/0075; H02J 1/00; H02J 1/082; H02J 1/12; H02J 2300/26; H02J 3/004; H02J 3/381; H02H 7/26; Y02B 10/70; Y02B 10/72; Y02B 90/20; Y02E 10/56; Y02E 10/566;
(Continued)

(56) References Cited

U.S. PATENT DOCUMENTS 4,401,935 A 8/1983 Yerkes
6,590,793 B1 7/2003 Nagao et al.
(Continued)

FOREIGN PATENT DOCUMENTS

| CN | 102593936 A | * | 7/2012 |
|---|---|---|---|
| CN | 105993106 A | | 10/2016 |
| CN | 106300329 A | | 1/2017 |

OTHER PUBLICATIONS

May 25, 2018—Partial EP search report EP 18150295.6.
Feb. 18, 2019—EP Office Action—EP 18150295.6.
Dec. 2, 2022—CN Office Action—CN App. No. 201810010340.0.

*Primary Examiner* — Chun Cao
(74) *Attorney, Agent, or Firm* — Banner & Witcoff, Ltd.

(57) ABSTRACT

Various implementations described herein are directed to systems, apparatuses and methods for operating stand-alone power systems. The systems may include power generators (e.g., photovoltaic generators and/or wind turbines), storage devices (e.g., batteries and/or flywheels), power modules (e.g., power converters) and loads. The methods may include various methods for monitoring, determining, controlling and/or predicting system power generation, system power storage and system power consumption.

20 Claims, 16 Drawing Sheets

Related U.S. Application Data

(60) Provisional application No. 62/444,494, filed on Jan. 10, 2017.

(51) Int. Cl.
*H02J 3/06* (2006.01)
*H02J 7/35* (2006.01)
*H02J 9/06* (2006.01)
*H02J 3/38* (2006.01)

(52) U.S. Cl.
CPC ............... *H02J 7/35* (2013.01); *H02J 9/062* (2013.01); *H02J 2300/26* (2020.01); *Y02B 10/70* (2013.01); *Y02E 10/56* (2013.01)

(58) Field of Classification Search
CPC ....... Y02E 10/58; Y02E 10/76; Y02E 10/766; Y04S 10/50; Y04S 20/12; Y04S 40/126
USPC .......................................................... 700/297
See application file for complete search history.

(56) References Cited

U.S. PATENT DOCUMENTS

| | | | |
|---|---|---|---|
| 10,628,897 B2* | 4/2020 | Yoscovich | H02J 9/062 |
| 2003/0047209 A1 | 3/2003 | Yanai et al. | |
| 2005/0017697 A1* | 1/2005 | Capel | G05F 1/67 |
| | | | 323/266 |
| 2009/0039826 A1 | 2/2009 | Yeh et al. | |
| 2011/0291479 A1 | 12/2011 | Lee | |
| 2012/0047386 A1 | 2/2012 | Matsui | |
| 2012/0091943 A1 | 4/2012 | Manor et al. | |
| 2013/0327077 A1* | 12/2013 | Motsenbocker | H02J 1/00 |
| | | | 62/324.1 |
| 2014/0054957 A1 | 2/2014 | Bellis | |
| 2014/0359332 A1 | 12/2014 | Todeschini et al. | |
| 2015/0155720 A1 | 6/2015 | Mise et al. | |
| 2015/0303739 A1 | 10/2015 | Shibata et al. | |
| 2016/0226255 A1 | 8/2016 | Sugeno et al. | |
| 2016/0329716 A1 | 11/2016 | Inoue | |
| 2017/0085087 A1* | 3/2017 | Rogers | H02J 3/383 |
| 2018/0205231 A1* | 7/2018 | Jury | H02J 1/108 |

* cited by examiner

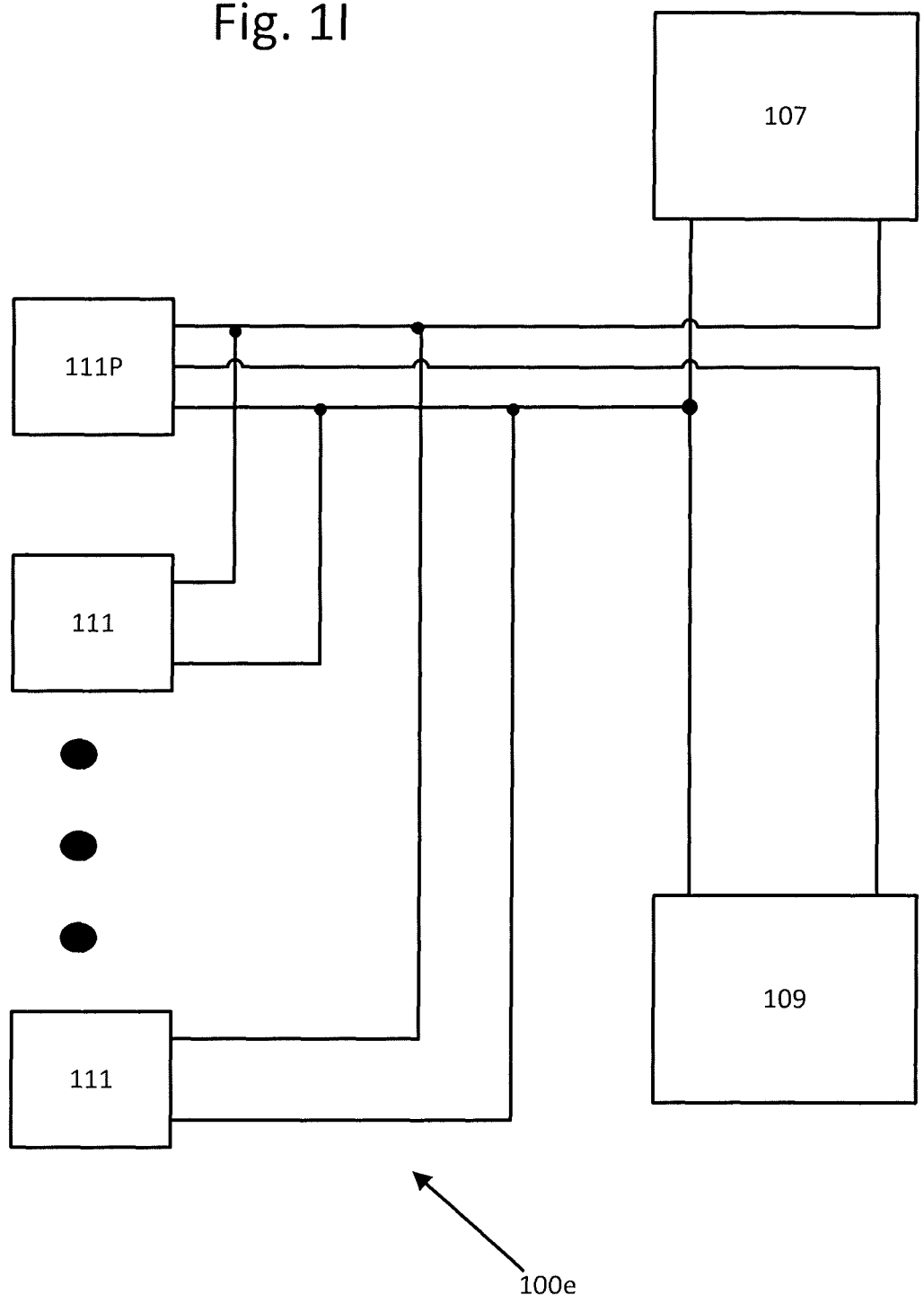

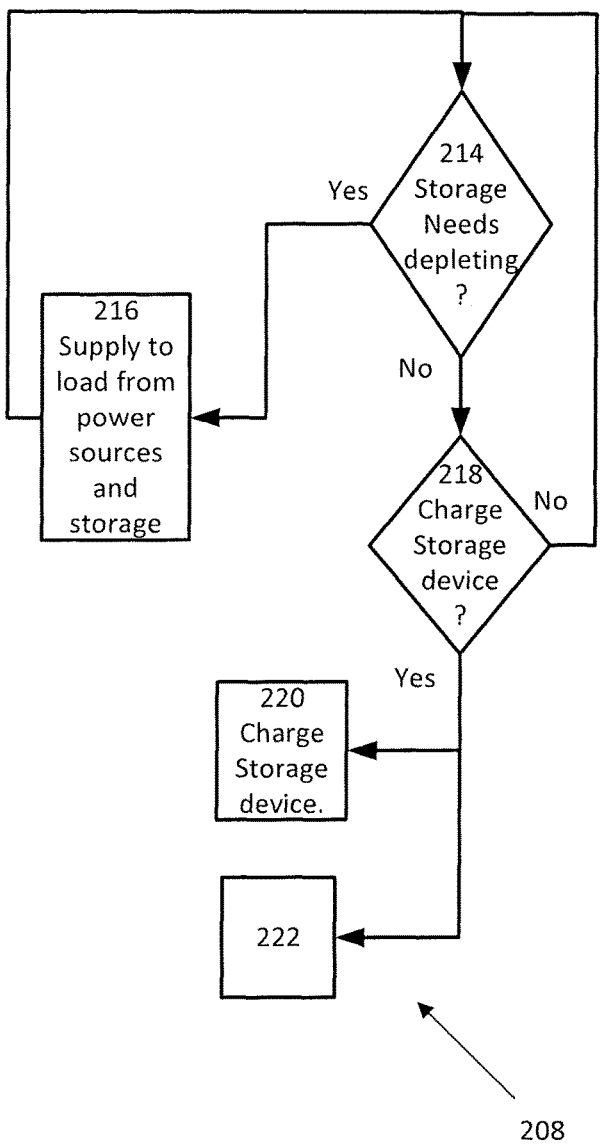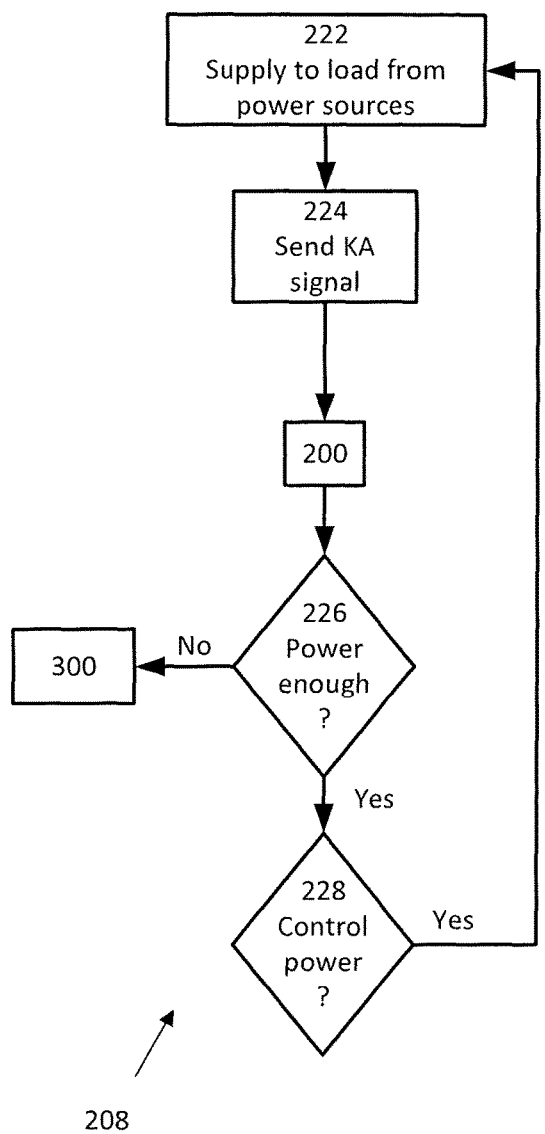

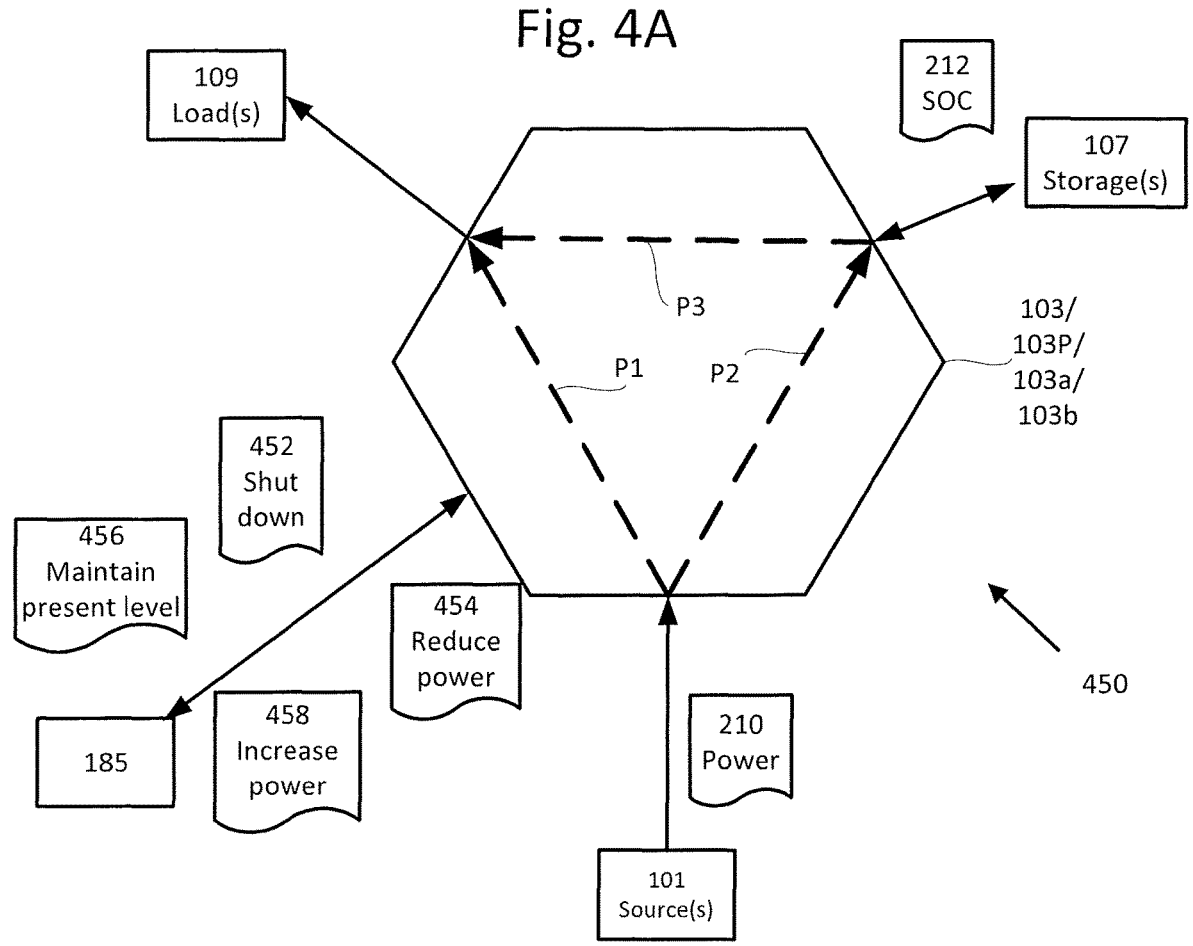

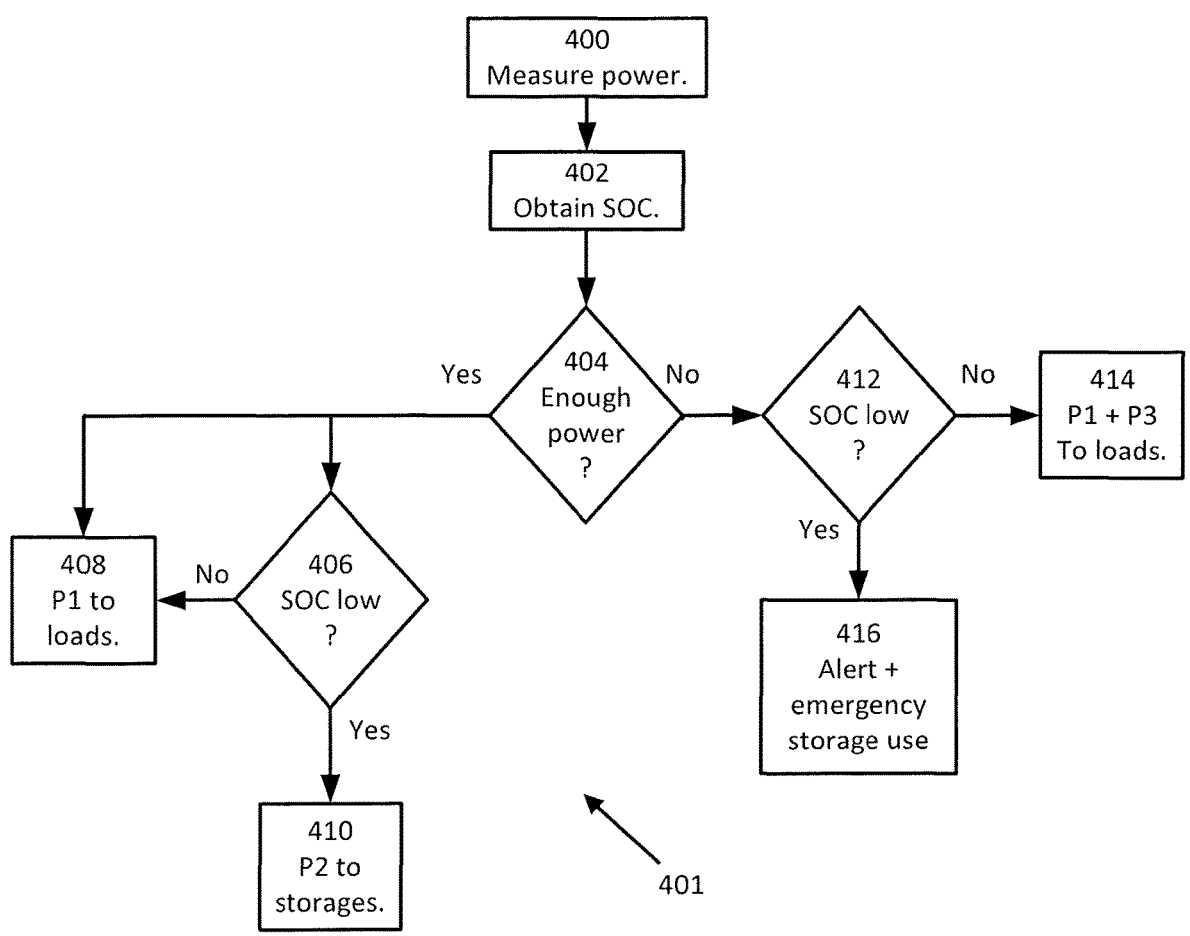

Fig. 5
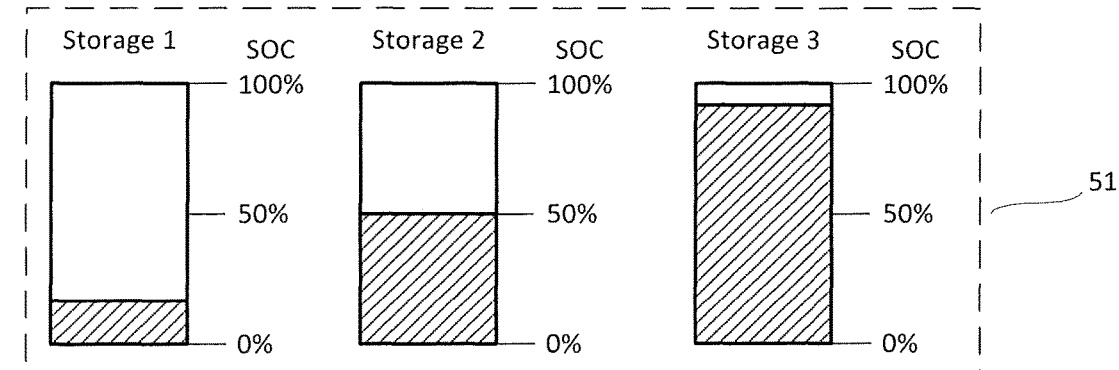
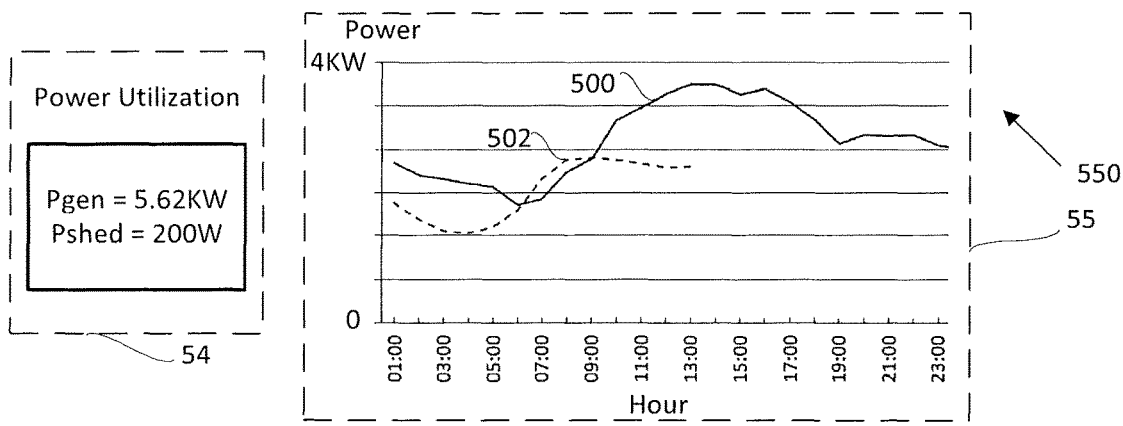

SYSTEM AND METHOD FOR SUPPLYING POWER FROM A POWER SYSTEM

RELATED APPLICATIONS

This application is a continuation of U.S. non-provisional application Ser. No. 15/861,748, filed Jan. 4, 2018, which claims priority to U.S. provisional application Ser. No. 62/444,494, filed Jan. 10, 2017, the entire contents of which are incorporated herein by reference.

BACKGROUND

A stand-alone power system (SAPS), also known as remote area power supply (RAPS), may be an off-the-grid electricity system that may be suitable for locations that are not fitted with an electricity distribution system. Typical SAPS may include one or more methods of electricity generation, energy storage, and regulation. Storage may be implemented as a battery bank, but other solutions exist including fuel cells and super capacitors, for example. Power drawn directly from the storage may be used for lighting as well as for other direct current (DC) appliances. Stand-alone photovoltaic power systems may be independent of the utility grid and may use solar panels only or may be used in conjunction with a diesel generator, a wind turbine or batteries, for example. Challenges for the design and implementation of stand-alone power systems may include improving their performance, establishing techniques for accurately predicting their output, and reliably integrating them with other generating sources.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Illustrative embodiments disclosed herein may include a direct current (DC) system utilized to supply DC power to a load and/or a storage device. The DC system may include various interconnections of groups of DC power sources that also may be connected in various series, parallel, series parallel, and/or parallel series combinations, for example.

As noted above, this Summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

FIG. 1I shows a connection configuration in a power system, according to a feature of one or more illustrative embodiments.

FIGS. 2C, 2D and 2E are flow charts describing methods for operating a power system according to one or more illustrative embodiments.

FIG. 4A is a block diagram of a power system according to one or more illustrative embodiments.

FIG. 4B is a flow chart describing a method for operating a power system according to one or more illustrative embodiments.

FIG. 5 shows a user interface according to a feature of one or more illustrative embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1A:
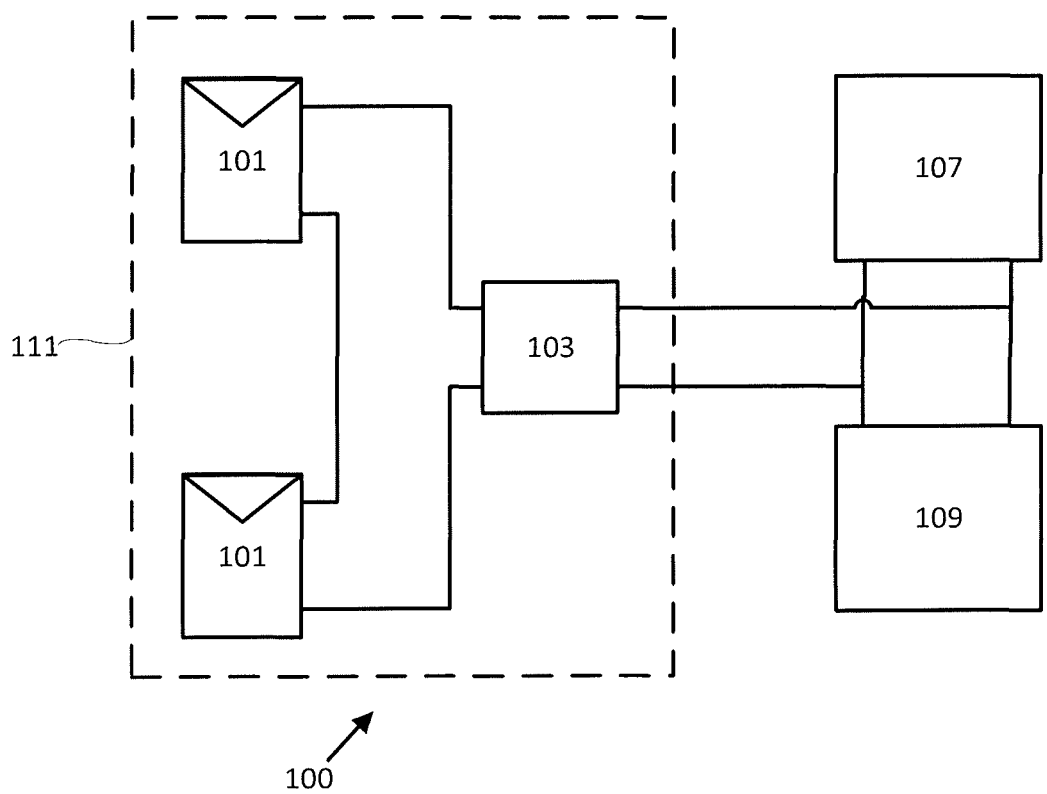
FIG. 1A illustrates a power system, according to a feature of one or more illustrative embodiments.

Reference is made to FIG. 1A, which shows a block diagram of a power system 100, according one or more illustrative embodiments. A connection configuration 111 includes a power source 101 with direct current (DC) output terminals connected to the input terminals of power module 103. DC output terminals of power module 103 may include a positive DC output connected to a positive DC input terminal of load 109 and a positive DC input terminal of storage device 107. Power module 103 may further include a negative DC output terminal that may be connected to a negative DC input terminal of load 109 and a negative DC input terminal of storage device 107. In the descriptions that follow, power source 101 may be a photovoltaic (PV) generator, for example, a PV cell, a series string of PV cells, a parallel connection of serially connected PV strings of PV cells, a photovoltaic or solar panel, a DC generator, a battery, or a fuel cell. Storage device 107 may be variously implemented, for example, using a battery, super capacitor, flywheel and/or UltraBattery™. Load 109 may comprise one or more DC load circuits. For example, load 109 may comprise communication equipment (e.g. a cellular base-station) or other devices deployed in a location that might not be connected to an electrical grid. Power module 103 may be configured to output a DC voltage suitable for powering load 109, for example, 48V.

Figure 1B:
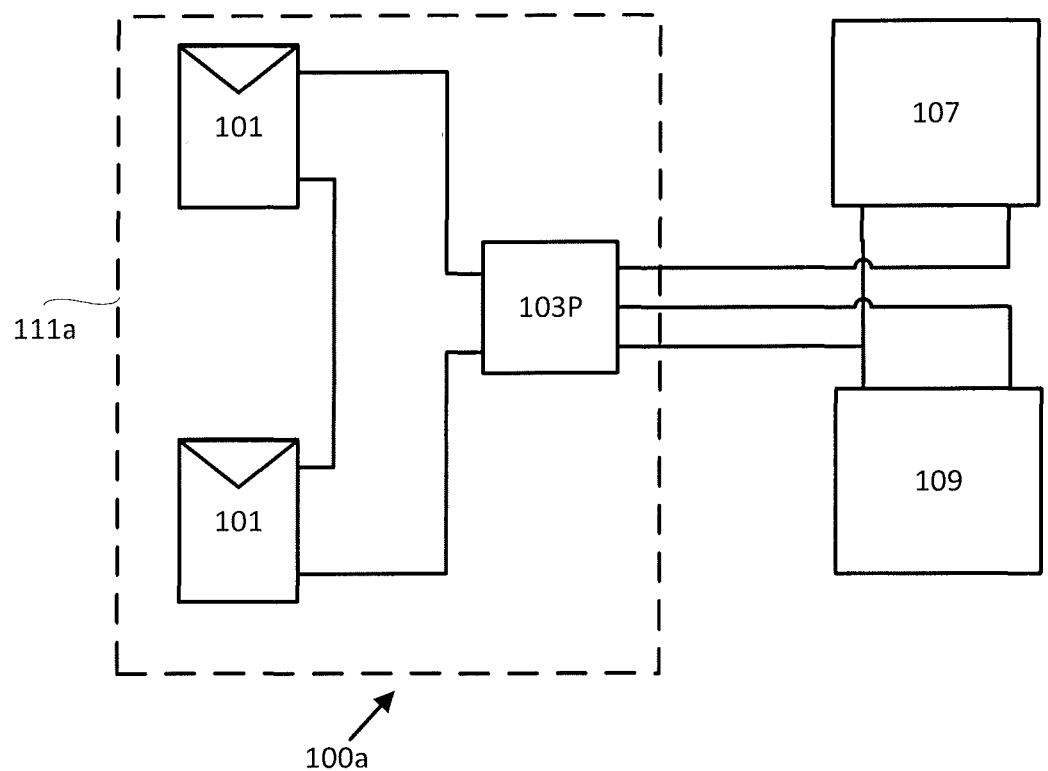
FIG. 1B illustrates a power system, according to a feature of one or more illustrative embodiments.

Reference is made to FIG. 1B, which shows a block diagram of a power system 100a, according one or more illustrative embodiments. A connection configuration 111a includes a power source 101 with direct current (DC) output terminals connected to the input terminals of power module 103P. DC output terminals of power module 103P may include a first positive DC output connected to a positive DC input terminal of load 109, and a second positive DC output connected to a positive DC input terminal of storage device 107. As described later in the descriptions that follow, the first and second positive DC outputs of power module 103P may be utilized so that power from power module 103P may be supplied to load 109, or to load 109 and storage device 107. Power module 103 may further include a negative DC output terminal that may be commonly connected to the negative DC input terminals of load 109 and storage device 107.

Power source 101 shown in both FIGS. 1A and 1B may be, for example, a wind turbine that produces alternating current (AC) and power modules 103 and 130P may serve as AC-to-DC converters such as rectifiers and/or include use of switched mode power supply, for example.

Figure 1C:
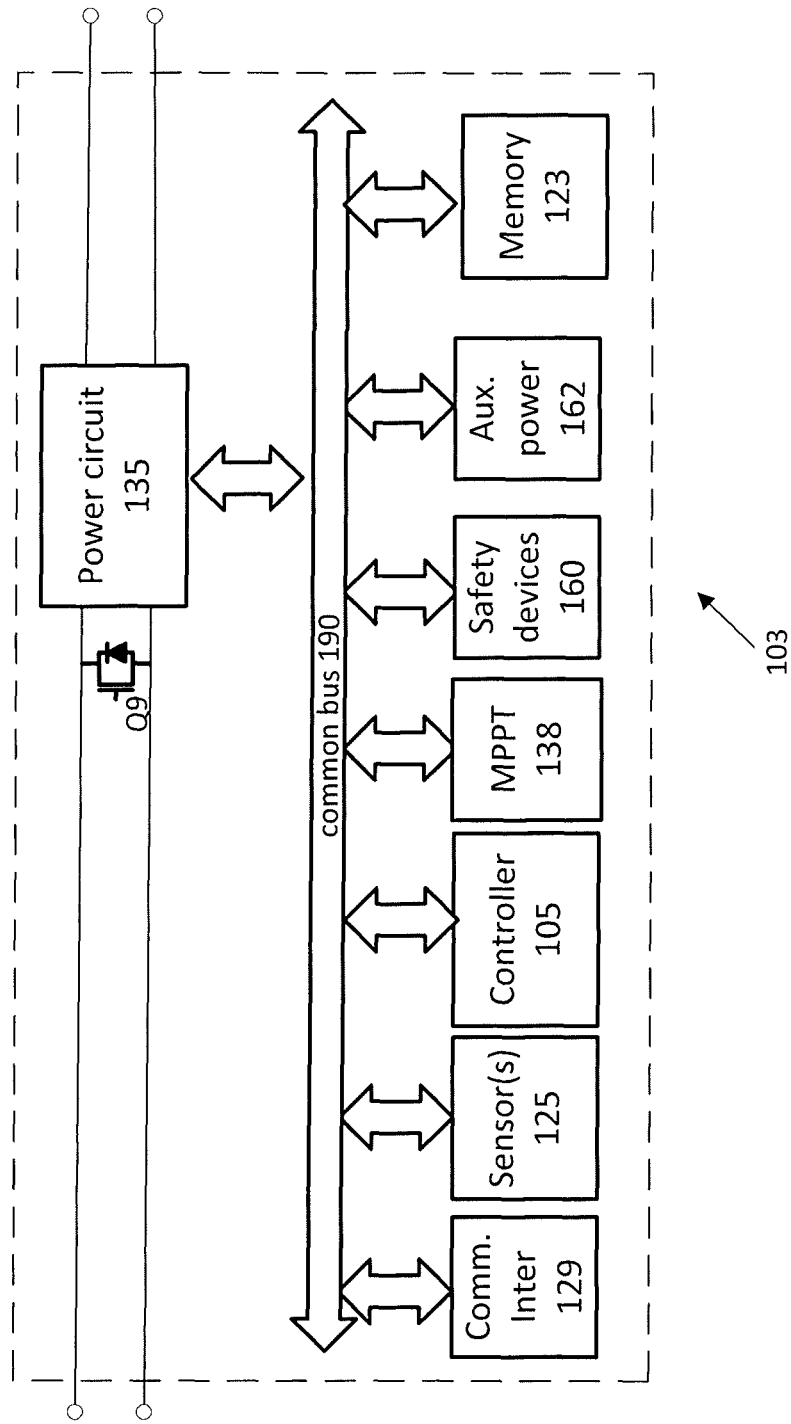
FIG. 1C shows further details of a power module, according to a feature of one or more illustrative embodiments.

Reference is now made to FIG. 1C, which illustrates circuitry that may be found in a power device such as power module 103, according to an illustrative embodiment. Power module 103 may be similar to or the same as power module 103P shown in FIG. 1B or other power modules as described in the descriptions that follow. In some embodiments, power module 103 may include power circuit 135. Power circuit 135 may include a direct current to direct current (DC/DC) converter such as a Buck, Boost, Buck/Boost, Buck+Boost, Cuk, Flyback and/or forward converter. In some embodiments, power circuit 135 may include a direct current-alternating current (DC/AC) converter (also known as an inverter), such as a micro-inverter. Power circuit 135 may have two input terminals and two output terminals, which may be the same as the input terminals and output terminals of power module 103. In some embodiments, power module 103 may include Maximum Power Point Tracking (MPPT) circuit 138, which is configured to extract increased power from a power source the power device is coupled to. In some embodiments, power circuit 135 may include MPPT functionality. In some embodiments, MPPT circuit 138 may implement impedance matching algorithms to extract increased power from a power source the power device is coupled to. Power module 103 may further include controller 105 such as a microprocessor, Digital Signal Processor (DSP), Application-Specific Integrated Circuit (ASIC) and/or a Field Programmable Gate Array (FPGA). Referring still to FIG. 1C, controller 105 may control and/or communicate with other elements of power module 103 over common bus 190. In some embodiments, power module 103 may include circuitry and/or sensor unit 125 configured to measure parameters directly or receive measured parameters from connected sensors and/or sensor interfaces configured to measure parameters on or near the power source, such as the voltage and/or current output by the power source and/or the power output by the power source. In some embodiments, the power source may be a photovoltaic (PV) generator comprising PV cells, and a sensor unit (e.g., one or more sensors and/or sensor interfaces) may directly measure or receive measurements of the irradiance received by the PV cells, and/or the temperature on or near the PV generator.

Referring still to FIG. 1C, in some embodiments, power module 103 may include communication interface 129, which is configured to transmit and/or receive data and/or commands from other devices. Communication interface 129 may communicate using Power Line Communication (PLC) technology, or wireless technologies such as Zig-Bee™, Wi-Fi, cellular communication or other wireless methods. In some embodiments, power module 103 may include memory device 123, for logging measurements taken by sensor(s)/sensor interfaces 125 to store code, operational protocols or other operating information. Memory device 123 may be Flash, Electrically Erasable Programmable Read-Only Memory (EEPROM), Random Access Memory (RAM), Solid State Devices (SSD) or other types of appropriate memory devices.

Referring still to FIG. 1C, in some embodiments, power module 103 may include safety devices 160 (e.g. fuses, circuit breakers and Residual Current Detectors). Safety devices 160 may be passive or active. For example, safety devices 160 may include one or more passive fuses disposed within power module 103 and designed to melt when a certain amount of current flows through it, disconnecting part of power module 103 to avoid damage. In some embodiments, safety devices 160 may include active disconnect switches, which are configured to receive commands from a controller (e.g. controller 105, or an external controller) to disconnect portions of power module 103, or configured to disconnect portions of power module 103 in response to a measurement measured by a sensor (e.g. a measurement measured or obtained by sensor unit 125). In some embodiments, power module 103 may include auxiliary power circuit 162, which is configured to receive power from a power source coupled to power module 103, and output power suitable for operating other circuitry components (e.g., controller 105, communication interface 129, etc.). Communication, electrical coupling and/or data-sharing between the various components of power module 103 may be carried out over common bus 190.

Referring still to FIG. 1C, in some embodiments, power module 103 may include transistor Q9 coupled between the inputs of power circuit 135. Transistor Q9 may be controlled by controller 105. If an unsafe condition is detected, controller 105 may set transistor Q9 to ON, short-circuiting the input to power circuit 135. Transistor Q9 may be controlled in conjunction with switch SW1 of FIG. 1D. When switch SW1 and transistor Q9 are OFF, each pair of power sources 101 of FIGS. 1A and 1B are disconnected. In a case in which the pair of power sources 101 are photovoltaic (PV) generators, each PV generator provides an open-circuit voltage at its output terminals. When switch SW1 and transistor Q9 are ON, each pair of PV generators of FIGS. 1A and 1B are connected and short-circuited, the pair of PV generators providing a voltage of about zero to power circuit 135. In both scenarios, a safe voltage may be maintained, and the two scenarios may be staggered to alternate between open-circuiting and short-circuiting PV generators. This mode of operation may allow continuous power supply to system control devices, as well as provide backup mechanisms for maintaining a safe voltage (i.e., in case a switch SW1 malfunctions, operation of transistor Q9 may allow continued safe operating conditions).

Figure 1D:
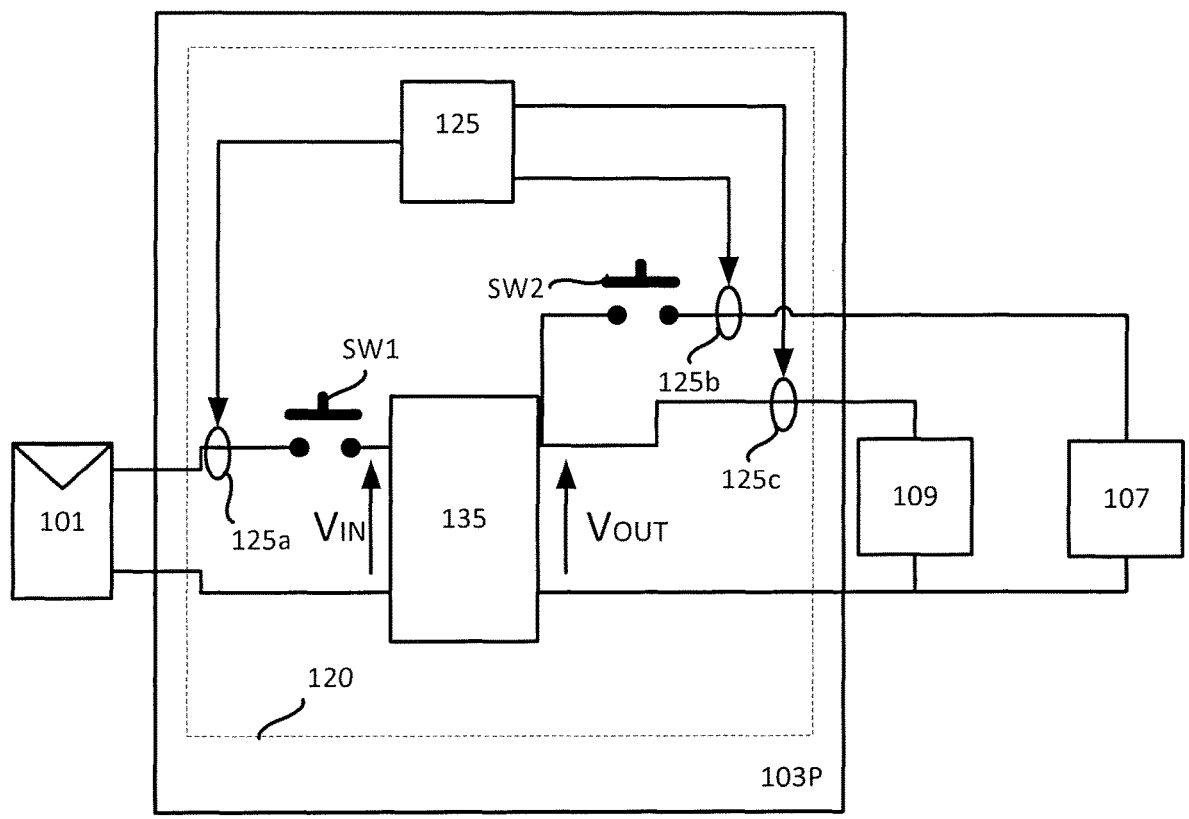
FIG. 1D shows further details of a power circuit, according to a feature of one or more illustrative embodiments.

Reference is made to FIG. 1D, which shows further details of power circuit 120 utilized in power module 103P, according to one or more illustrative embodiments. Controller 105, memory device 123 and communication interface 129 are not included in the drawing of the power modules 103 and 103P in order to simplify the drawing. A negative output terminal of power source 101 connects to a negative input terminal of power circuit 135. In some embodiments, a switch SW1 may be provided as an optional component that connects serially between a positive output terminal of power source 101 and a positive input terminal of power circuit 135 for purposes of safety in order to isolate power source 101 from the positive input terminal of power circuit 135. In some embodiments, switch SW1 may connect in parallel across power source 101, so that in the case of power source 101 being a solar panel which is underperforming compared to other solar panels, the solar panel may be bypassed when switch SW1 is ON.

A positive output terminal of power circuit 135 may be split in two and may connect respectively to a positive input terminal of load 109 and a positive input terminal of storage device 107. A switch SW2 may be provided as an optional component, which connects serially between the positive output terminal of power circuit 135 and a positive input terminal of storage device 107. With switch SW2 in an ON position, load 109 and storage device 107 are connected in parallel across output terminals of power circuit 135. With switch SW2 in an OFF position, load 109 remains connected across the output terminals of power circuit 135, and storage device 107 is disconnected from the output terminals of power circuit 135. In the context of a photovoltaic (PV) panel implementation of power system 100, operation of SW2 when ON may allow power (e.g. power of FIG. 2C) to be supplied to load 109 and storage device 107 during operation when power from power source 101 may be sufficient (e.g. during the daytime). Switch SW2 when OFF may allow power to be supplied to load 109 if charging of storage device 107 is to be avoided (e.g., when storage device 107 is already substantially fully charged, or to reduce charging cycles of storage device 107, or when power from power source 101 is insufficient to both power load 109 and storage device 107). When power from the power source 101 may be insufficient, switch SW2 may be in the ON position, allowing power from storage device 107 to be applied to load 109.

Sensor/sensor interface 125 operatively attached to controller 105 may include analog to digital converters (not shown) that may be connected to sensors 125a, 125b and 125c. Sensors 125a, 125b and 125c may be configured to sense electrical parameters such as current, voltage and/or power of load 109, storage device 107 and the input and/or output parameters of power circuit 135 and power source 101. Optionally, sensor/sensor interface 125b may also include an energy gauge to count coulombs (amperes per second) when either charging or discharging storage device 107. Sensors 125a, 125b and 125c may optionally be located and integrated inside power circuit 135. Sensors 125b and 125c may be optionally spatially located in the vicinity of storage device 107 and load 109 respectively. Similarly, sensor 125a may be spatially located in the vicinity of power source 101. Additional sensors may be added and configured to sense, for example, temperature, humidity and luminance.

Operation of switch SW1 may be based on electrical parameters sensed in power circuit 120 and may be activated in any case of over-voltage or over-current, over-temperature and under-voltage or under-current.

Figure 1E:
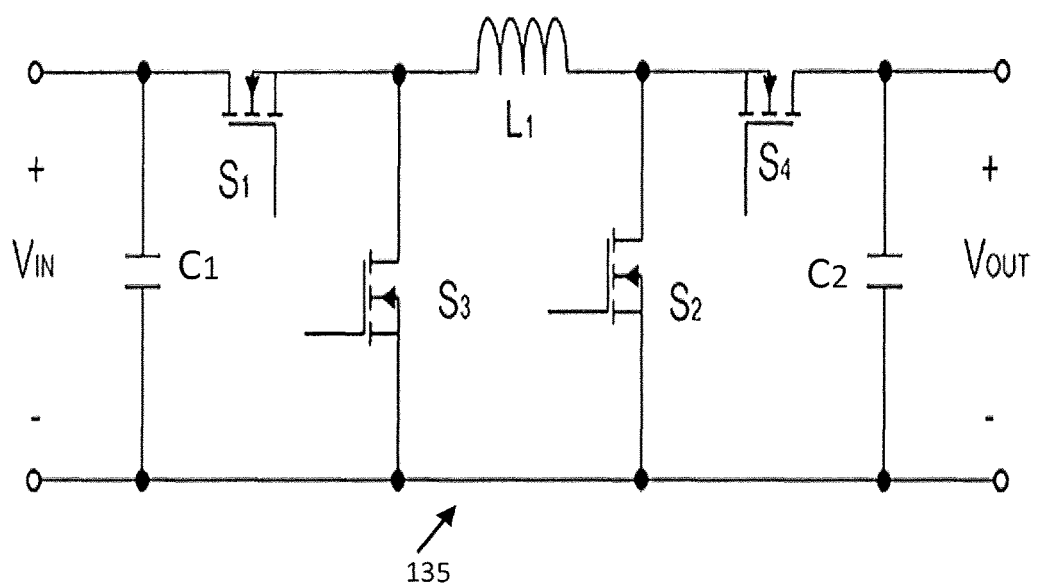
FIG. 1E shows a buck+boost circuit implementation for a power circuit, according to a feature of one or more illustrative embodiments.

Reference is made to FIG. 1E, which shows a buck+boost circuit implementation for power circuit 135, according to a feature of one or more illustrative embodiments. Capacitor C1 may connect in parallel across the positive and negative input terminals of the buck+boost circuit where the voltage is indicated as VIN. Capacitor C2 may connect in parallel across the positive and negative output terminals of the buck+boost circuit where the voltage is indicated as VOUT. The sources of insulated gate field effect transistors (IGFETs) S3 and S2 connect to the common negative output and input terminals of the buck+boost circuit. The drain of switch S1 connects to the positive input terminal, and the source of switch S1 connects to the drain of switch S3. The drain of switch S4 connects to the positive output terminal, and the source of switch S4 connects to the drain of switch S2. Inductor L1 connects respectively between the drains of switches S3 and S4. The gates of switches S1, S2, S3 and S4 may be operatively connected to controller 105 (see also FIG. 1C).

Switches S1, S2, S3 and S4 may be alternatively implemented for example using metal oxide semiconductor field effect transistors (MOSFETs), insulated gate bipolar transistors (IGBTs), bipolar junction transistors (BJTs), Darlington transistor, diode, silicon controlled rectifier (SCR), Diac, Triac or other semi-conductor switches. Similarly, implementation for power circuit 135 may include, for example, a buck circuit, a boost circuit, a buck/boost circuit, a Flyback circuit, a Forward circuit, a charge pump, a Cuk converter or any other circuit that may be utilized to convert power on the input of power circuit 135 to the output of power circuit 135.

Power circuit 135 may include or be operatively attached to a maximum power point tracking (MPPT) circuit 138. MPPT circuit 138 may also be operatively connected to controller 105 or another controller. MPPT circuit 138 under control of controller 105 or a central controller may be utilized to increase power extraction from power sources 101 and/or to control voltage and/or current supplied to load 109 and storage device 107 in order to avoid damage to load 109 and storage device 107. Control of voltage and/or current to load 109 and storage device 107 therefore, might not necessarily utilize the feature of increasing power from power sources 101, but rather may utilize MPPT circuit 138 to operate at a point in order to shed some of the power produced by power sources 101.

Figure 1F:
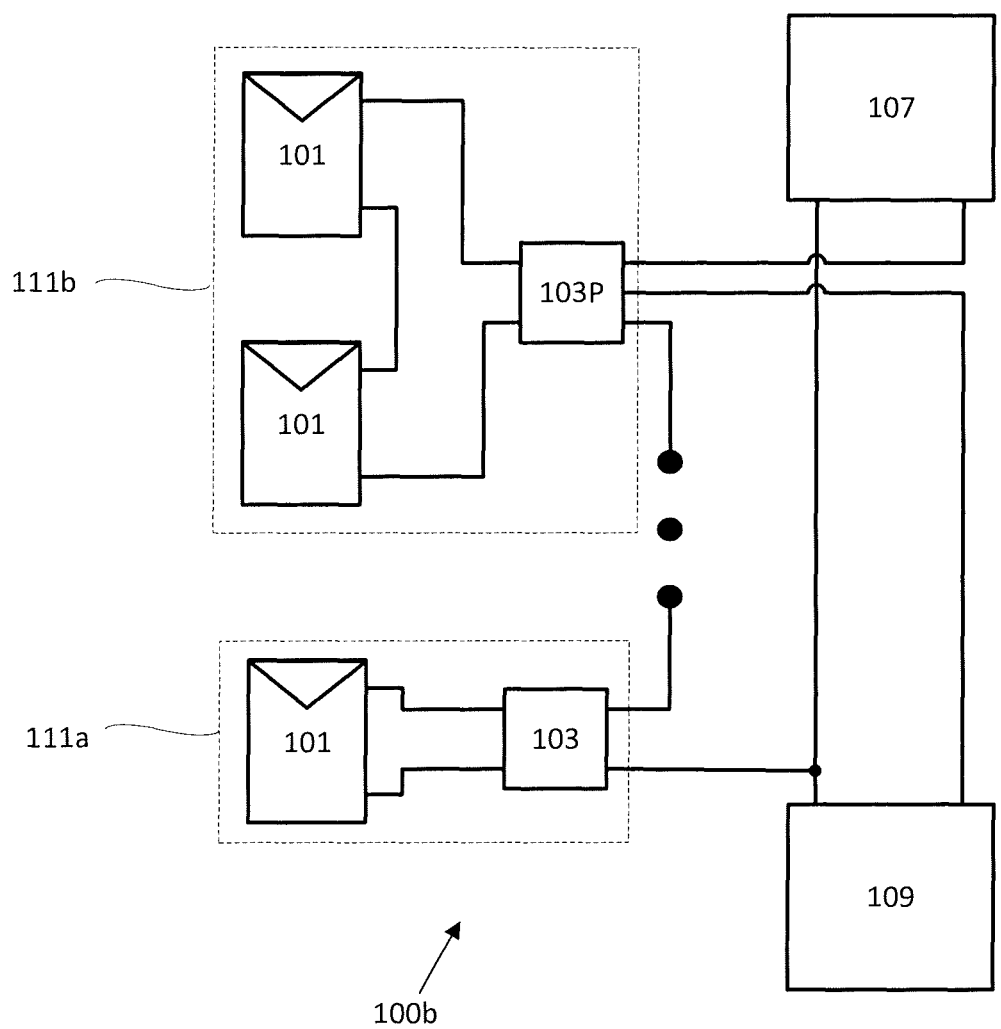
FIGS. 1F, 1G and 1H show connection configurations, according to features of one or more illustrative embodiments.

Reference is now made to FIG. 1F, which shows a block diagram of a power system 100b, according to one or more illustrative embodiments. Connection configuration 111a shows a power source 101 with direct current (DC) output terminals connected to input terminals of power module 103. Connection configuration 111b shows two power sources 101 connected in a series connection, with direct current (DC) output terminals of the series connection connected to the input terminals of power module 103. A negative output terminal of power module 103 in connection configuration 111a may be connected in common with the negative input terminals of load 109 and storage device 107. The positive output terminal of power module 103 in connection configuration 111a may be connected to the negative output terminal of another power module 103 or to power module 103P in connection configuration 111b. The positive output terminal of power module 103P may connect to the positive input terminal of load 109. A positive output terminal of power module 103P that is coupled to switch SW2 may connect to the positive input terminal of storage device 107. In the descriptions that follow, connections to storage device 107 and/or load 109 may be from power module 103P or power module 103.

Series connections of power sources 101 as shown in connection configuration 111b may provide a higher voltage input into power module 103 compared to an input to power module 103 from a single power source 101. Series connections of the outputs of power modules 103 may similarly provide a higher voltage output into load 109 and/or storage device 107.

Figure 1G:
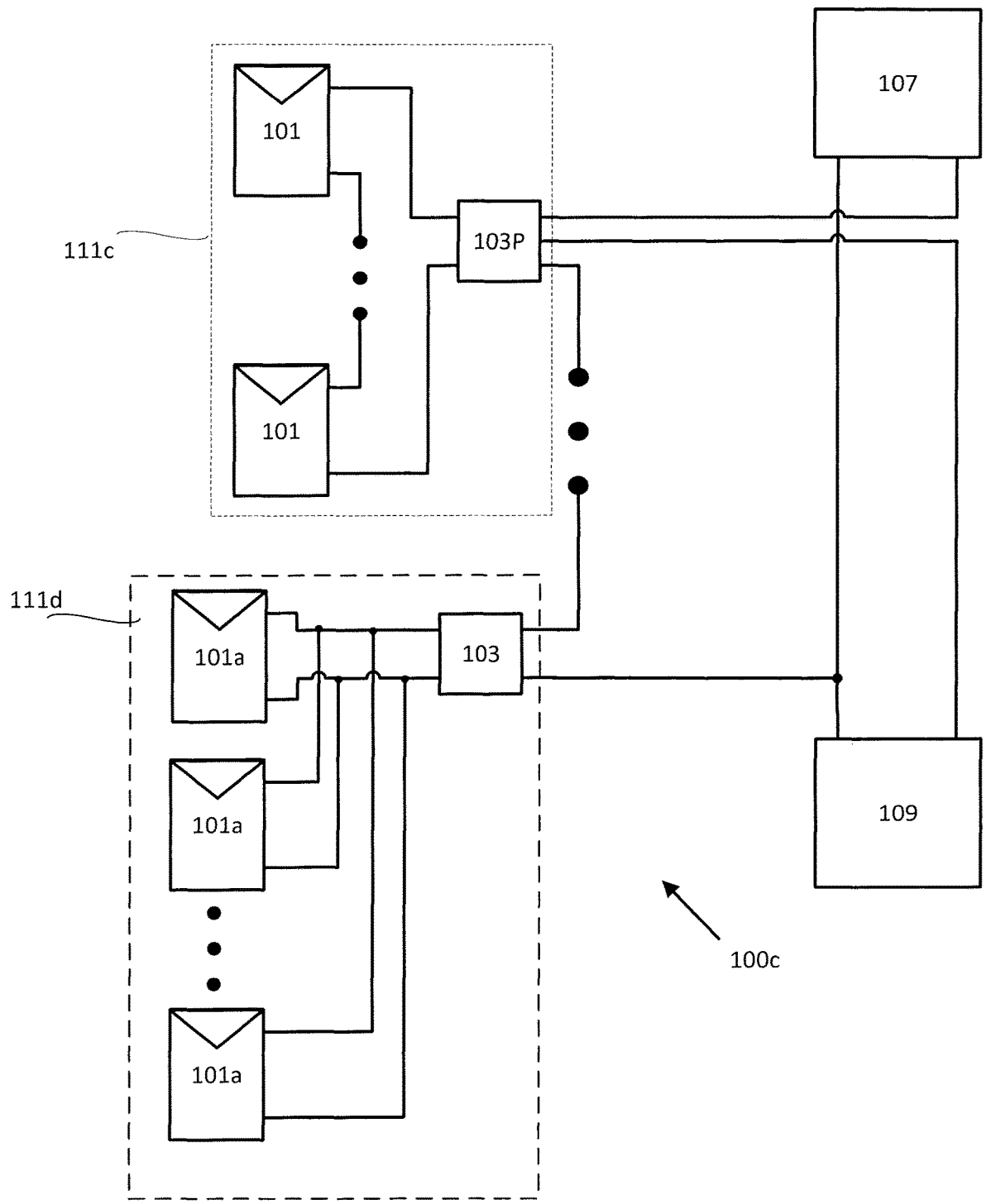

Reference is now made to FIG. 1G, which shows a block diagram of a power system 100c and connection configurations 111c and 111d, according to one or more illustrative embodiments. The series output connections of power modules 103 and 103P shown in FIG. 1F to load 109 and storage device 107 may be the same as the series output connections of power modules 103 and 103P shown in FIG. 1G. Connection configuration 111d may have multiple power sources 101a with their output terminals connected in parallel across the input of power module 103. Power sources 101a may differ in power rating output (Power=Voltage×Current) compared to the power rating output of power sources 101 shown with outputs connected in a series connection which may be connected across the input of power module 103P.

Figure 1H:
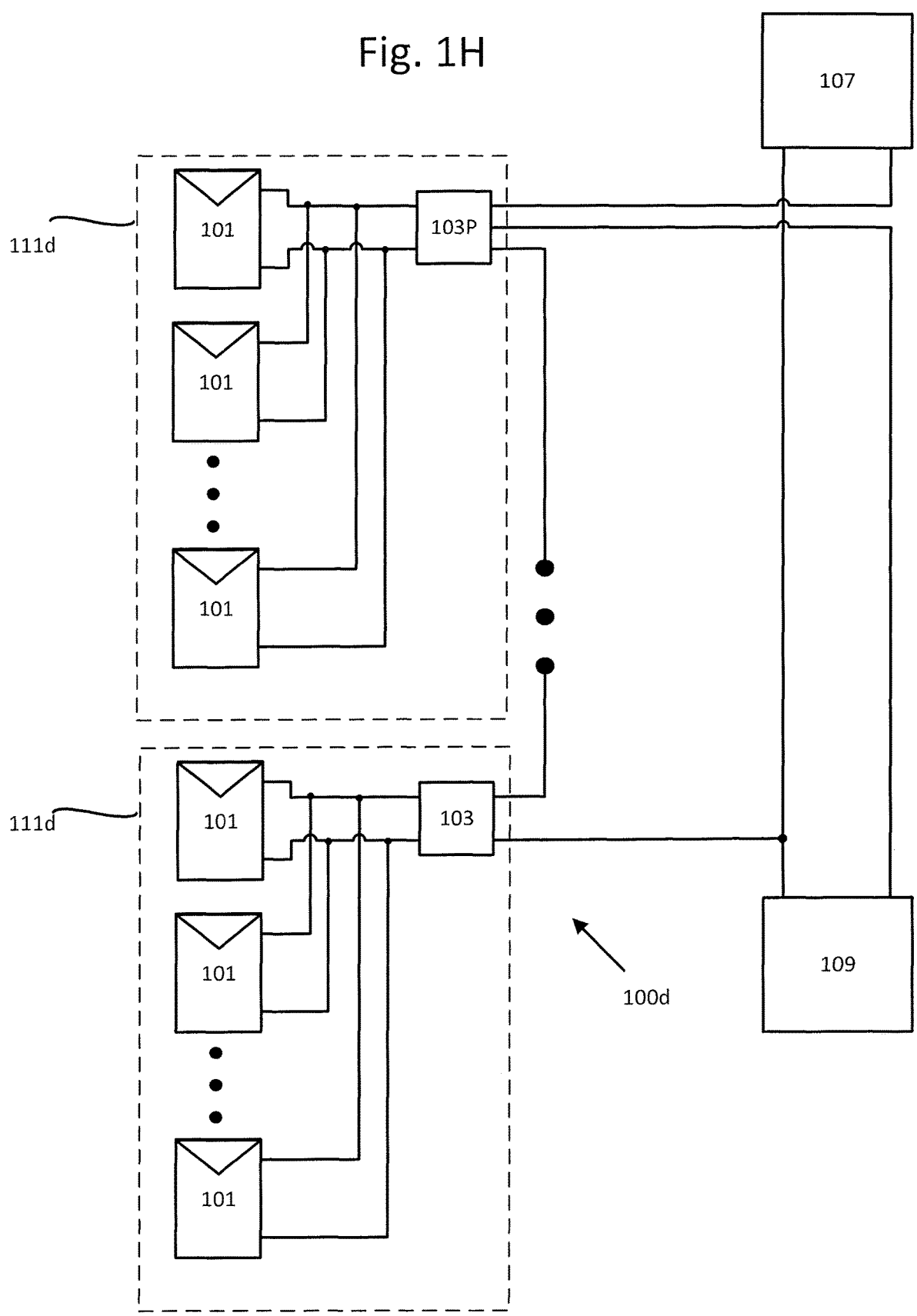

Reference is now made to FIG. 1H, which shows a block diagram of a power system 100d and a connection configuration 111d, according to one or more illustrative embodiments. Again, the series connection of the outputs of power modules 103 and 103P may be the same as shown in FIG. 1F and FIG. 1G. The alternative connection configuration is shown with multiple connection configurations 111d where each connection configuration 111d has multiple power sources 101 with their output terminals connected in parallel across the input of respective power modules 103/103P.

Reference is now made to FIG. 1I, which shows a connection configuration 111 in power system 100e, according to one or more illustrative embodiments. Connection configurations 111 and 111P have their outputs connected in a parallel connection that may be connected to the input terminals of the load 109 and storage device 107 via connection configuration 111P. In particular, connection configuration 111P includes the use of power module 103P to provide two DC positive connections to load 109 and storage device 107 via switch SW2 (see also FIG. 1D). In another implementation, connection configurations 111 may be used to provide a single DC connection to load 109 and storage device 107. In general, any number of connection combinations of multiple connection configurations 111 may include DC power sources of differing types so that one connection configuration 111 has photovoltaic panels for example, while another connection configuration 111 has wind powered DC generators. In sum, connection configurations 111 may also include hybrid combinations of DC power derived from the interconnection of batteries, wind powered DC generators and/or petrol generators for example.

In the various aspects described above for power systems 100a, 100b, 100c, 100d and 100e, a communication protocol used by communication interface 129 of FIG. 1C in one primary power module 103P may communicatively control one or more other power modules 103 which are known as secondary power modules 103. Once a primary/secondary relationship is established, a direction of control may be from the primary power module 103P to the secondary power modules 103. When one primary power module 103P experiences a reduction of power input (e.g. due to shading in the case of photovoltaic panels used for power sources 101), and the outputs of power modules 103 are connected in series, the power supply to power the primary module 130P may be taken from the other power module 103 outputs (e.g. by coupling auxiliary power circuit 162 to an output of power circuit 135, which may be coupled to conductors carrying power from other power modules 103). In the case of shading of a panel in a series string including power modules 103 and/or power module 103P, a current bypass may be applied to the respective power module 103/103P and panel.

A communication protocol may be implemented for the direction of control between power modules and/or for transferring data and/or or commands from power module 103P to and between power modules 103 using, for example power line communication (PLC) techniques over power lines of power system 100, near field communication (NFC), Wi-Fi™ to connect to a wireless local area network (WLAN), Bluetooth™, ZigBee™ WiMAX™, controller area network (CAN) bus, local interconnect network (LIN), or any other suitable communication protocol.

Figure 1J:
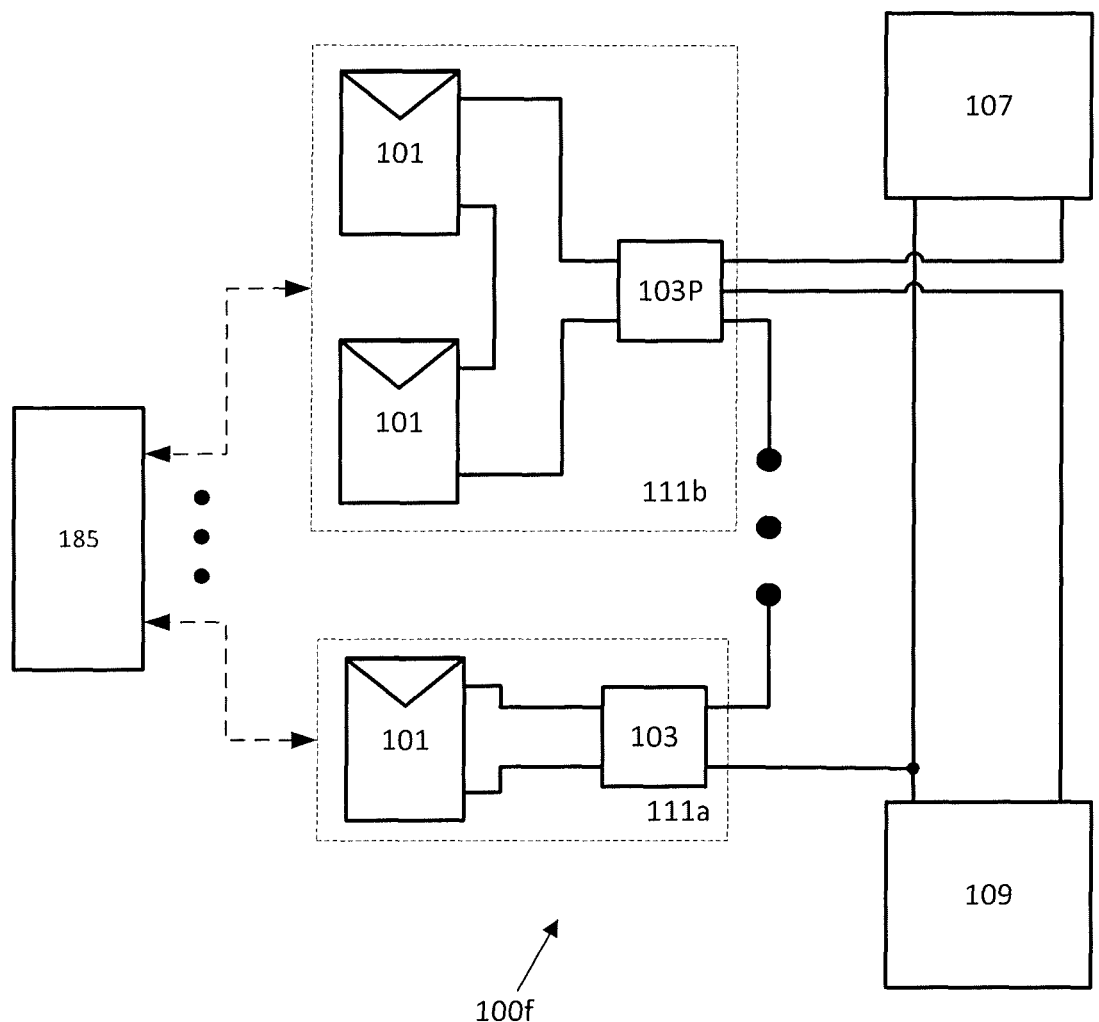
FIG. 1J shows a power system operably connected to a central controller, according to a feature of one or more illustrative embodiments.

Reference is now made to FIG. 1J, which shows connection of power system 100f operably connected to central controller 185, according to one or more illustrative embodiments. Central controller 185 may, in a similar manner to power modules 103/103P, include a controller 105 coupled to a memory device 123 and a communication interface 129. Central controller 185 may receive its power supply in order to operate from power modules 103/103P, from an additional auxiliary power supply or from storage device 107. Central controller 185 may receive from each power module 103/103P the electrical parameters sensed by sensors 125a, 125b and 125c such as current, voltage and/or power of load 109, storage device 107 and/or the input and/or output of power circuit and power source 101. In response to the sensed electrical parameters of each power module 103/103P, central controller 185 may send appropriate control signals to each power module 103/103P of power system 100b.

In the descriptions above concerning power modules 103P/103 and in descriptions of other power modules that follow, each power module utilized in power systems described herein may have the option of being designated as a primary power module, whereas other power modules may be designated as secondary power modules. A power module designated as a primary power module may be determined based on by a decision algorithm running in central controller 185 and/or by a remote computing platform operatively attached to central controller 185. In some embodiments, multiple power models may run a decision algorithm to select one of the multiple power models as a primary power module. Power modules 103P/103, central controller 185 and in descriptions of other power modules that follow, may derive their power needed to operate on the output side of the power modules, from storage device 107 and/or auxiliary power circuits 162. Auxiliary power circuits 162 may similarly derive their power needed to operate on the output side of the power modules or from a storage device 107.

Figure 1K:
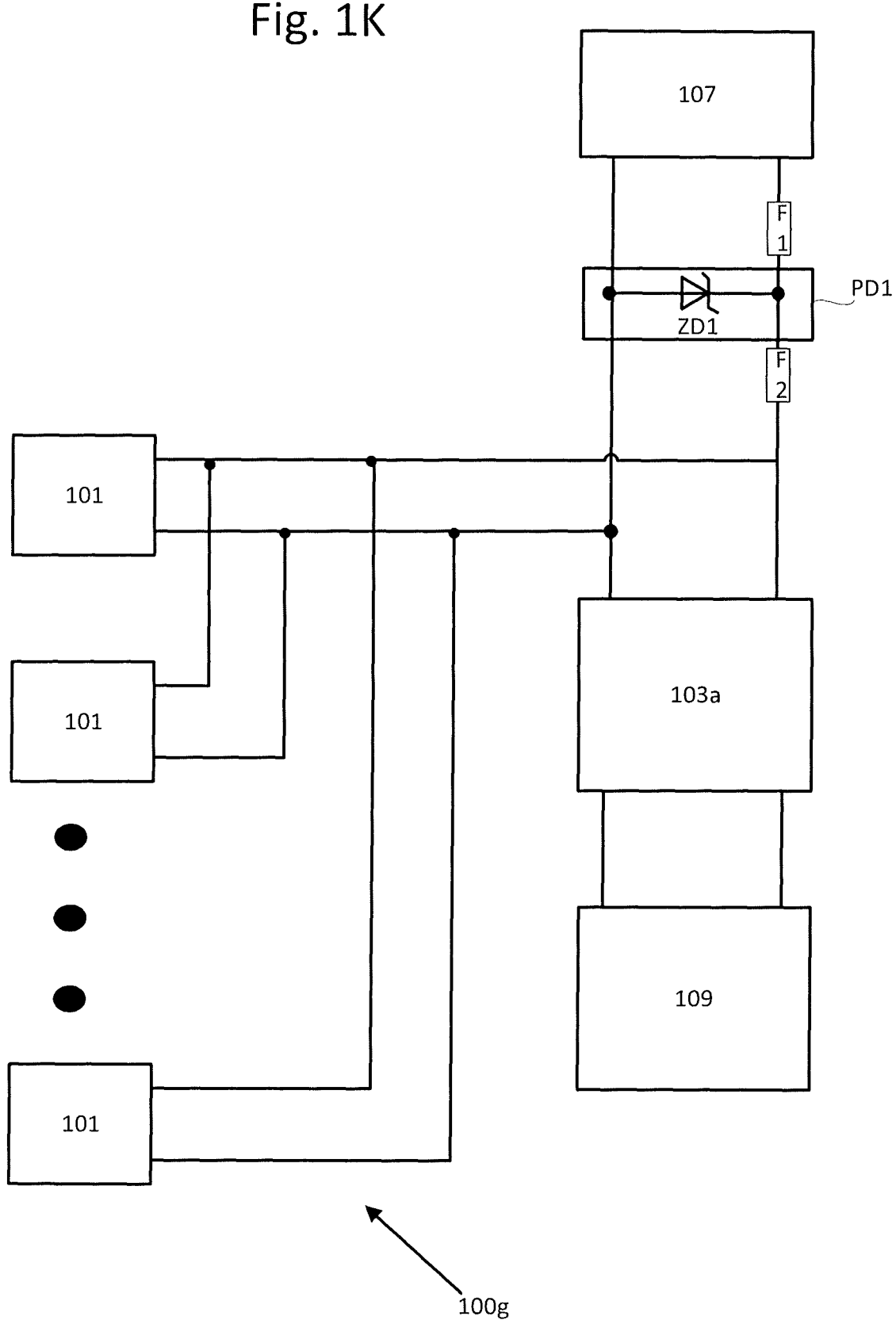
FIG. 1K illustrates a power system, according to a feature of one or more illustrative embodiments.

Reference is now made to FIG. 1K, which shows a power system 100g, according to one or more illustrative embodiments. Power sources 101 are shown with their outputs connected in a parallel connection. The parallel connection may be connected across the input of protection device PD1, which may be connected to the input of storage device 107. The parallel connection may also be connected across the input of power module 103a, and the output of power module 103a may be connected across load 109. Alternatively, the outputs of power sources 101 may have their outputs connected in a series connection that may also be similarly connected across the inputs of the input of power module 103a and protection device PD1. Indeed, any number of series/parallel or parallel series connections of power sources 101 may be connected across the inputs of power module 103a and protection device PD1.

Fuse F1 may connect between the positive terminal of storage device 107 and protection device PD1. Fuse F1 may be an integrated part of protection device PD1 or an integrated part of storage device 107. Fuse F2 may connect to the positive terminal of the parallel connection and to the positive input terminal of power module 103a. Fuse F2 may be an integrated part of protection device PD1. In some embodiments, protection device PD1 may be an integrated part of storage device 107.

Load 109 may include power module 103a as an integrated part of load 109 and/or may also include protection device PD1. In a similar way, storage device 107 may also have a power module and a protection device attached or the power module, and/or the protection device PD1 may be an integrated part of storage device 107.

Protection device PD1 is shown implemented with a Zener diode ZD1. Protection device PD1 in conjunction with fuses F1 and F2 that may be utilized for over-current and/or over-voltage protection and/or reverse polarity protection when power is being supplied to or from storage device 107. For example, Zener diode ZD1 may be rated to protect storage device 107 from an over-voltage condition, and fuses F1 and/or F2 may be rated to protect storage device 107 from an over-current condition. Protection device PD1 may also implemented with other protection devices such as circuit breakers and/or residual current devices.

Figure 2A:
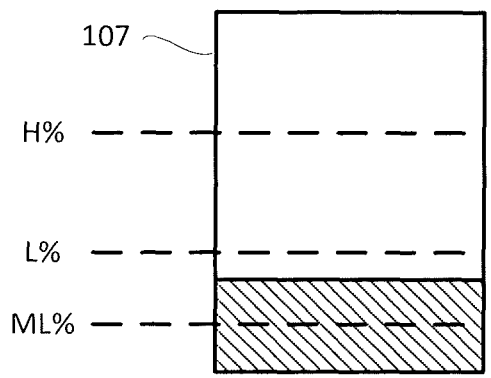
FIGS. 2A and 2B show views of a storage device, according to a feature of one or more illustrative embodiments.
Figure 2B:
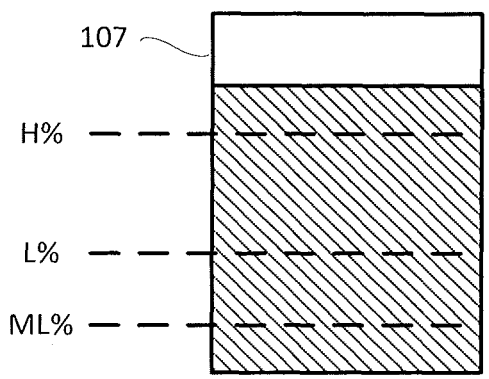

Reference is now made to FIGS. 2A and 2B, which show respective views of storage device 107, according to one or more illustrative embodiments. FIG. 2A shows storage device 107 after it has been mostly depleted but not empty of charge. The state of charge (SOC) of storage device 107 is shown by an area of cross hatching which is below a lower level of percentage charge L %. Central controller 185 may monitor and control the discharge of storage device 107 to prevent storage device 107 from falling below a minimal level ML %.

FIG. 2B shows storage device 107 after it has been charged and/or partially depleted. The state of charge (SOC) of storage device 107 is shown by an area cross hatching which is above a higher level of percentage charge H %. Central controller 185 may be configured to monitor and control the charge and/or discharge of storage device 107 so that storage device 107 is not damaged by overcharging or from over-depletion.

When storage device 107 is a battery, central controller 185 may have access to a charge profile stored in memory device 123 for the battery. For example, when using a lead acid battery for storage device 107, a charge profile for optimal charging of the lead acid battery may indicate preferred use of a constant voltage level for at least a minimum period of time. Measuring and controlling the temperature of the lead acid battery may also improve the performance and/or reliability of the battery, since the lead acid battery may need to stay cool when being charged so as to ensure optimal charging. In contrast to the lead acid based battery, a nickel based battery may prefer a fast charge rate with constant current. Consideration may be given to different types of batteries when charging and discharging to ensure that correct voltages, currents, temperatures and appropriate time periods of charge and discharge are monitored, controlled and applied to batteries so as to avoid damage.

Central controller 185 may be utilized to include control parameters for power modules 103/103P to function as constant current and/or constant voltage sources when storage device 107 is being charged according to an appropriate charge profile. The appropriate charge profile may consider the temperature of the battery, for example. The appropriate charge profile may further provide data logging via communication interface 129 to a server of the transfer of charge and/or discharge of a battery in order to access the ageing and use of batteries. Such data logging may then be able to provide an estimate of projected battery life and timing of battery replacement for example.

Figure 2C:
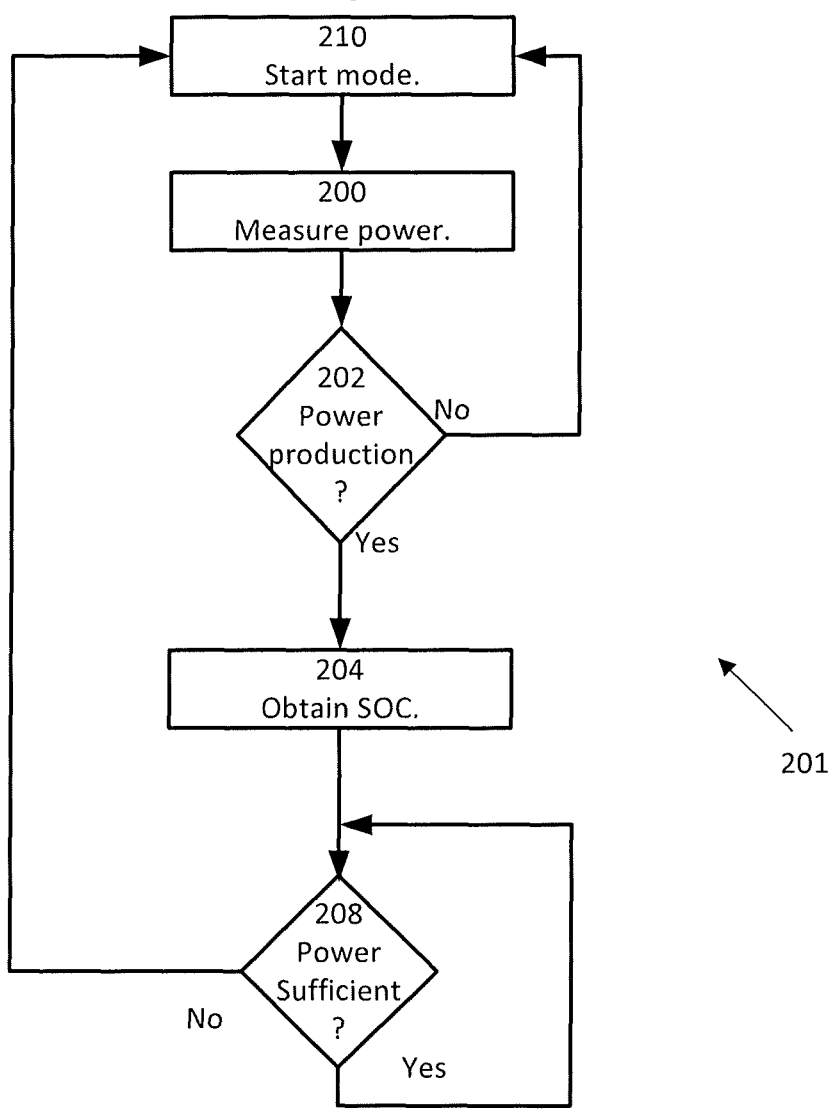

Reference is now made to FIG. 2C, which shows as a flow chart a method 201 according to one or more illustrative embodiments. Method 201 may be utilized for power systems 100a-d described above. In the following description of method 201, reference to the use of central controller 185 is made, however, the following description may also use one primary power module 103P to control one or more other secondary power modules 103.

Method 201 may begin in a start mode at step 210, at a time when power sources 101 may be producing substantially no power (e.g. at night time). If power from power sources 101 is substantially zero, power supplied to load 109 may come from storage device 107. A feature of start mode in step 210 may be the monitoring of sensor units 125, 125a, 125b and 125c to see if power sources 101 have begun to produce power and to monitor the state of charge (SOC) of storage device 107. Generally, in start mode in step 210, storage device 107 may supply load 109 with DC power.

When power sources 101 begin to produce power (e.g., in the case where photovoltaic generators are used as power sources 101, at dawn), central controller 185 may receive a signal from power modules 103/103P to indicate that the power sources 101 have started to produce power. Power produced by power sources 101 may be measured in step 200 using sensors 125 and in decision step 202, if power from power sources 101 is not sufficient (e.g., the power is below a threshold), a power system 100a-d may remain in start mode status (step 210). In general, for descriptions that follow a threshold may be predetermined and/or dynamically determined. In decision step 202, if the amount of power from power sources 101 is above a minimum threshold level of power so as to power load 109 or storage device 107 effectively, then the state of charge (SOC) of storage device 107 may be obtained (step 204) using sensors 125/125b.

At decision step 208, power and SOC may be used to determine how to supply load 109 with power. However, if at any point in time the power from power sources 101 falls below a threshold, power system 100 may return to start mode status (step 210). Power from power sources 101 not being sufficient may occur when, for example, PV generators are shaded or at dusk or during the night. Where power sources 101 may be wind powered DC generators for example, start mode in step 210 may be entered into due to the absence of substantial wind.

In general, for discussions that follow, features of decision step 208 are shown in greater detail with reference to PV power sources. Power supplied to load 109 depends on the amount of power measured in step 200 and the state of charge of storage device 107.

Reference is now made to FIG. 2D, which shows further details of decision step 208 shown in FIG. 2C, according to one or more illustrative embodiments. Decision step 208 may be reached when the amount of power from power sources 101 is above a minimum threshold level of power to supply load 109. Power of power sources 101 may be measured at step 200 and the state of charge (SOC) of storage device 107 may be obtained at step 204 using sensor units 125, 125a, 125b and 125c. Decision step 214 may be based in part on the SOC of storage device 107. When in start mode at step 210, storage device 107 might not have been depleted so much that the level of charge may still be above percentage charge level H % and/or somewhere in between percentage charge level H % and percentage charge level L %. As such, when the amount of power available from power sources 101 is above a minimum threshold level of power, storage device 107 along with the power from power sources 101 may be utilized to supply a supplemental power to load 109 (step 216).

Power provided to load 109 from storage device 107 may extend the provision of power to load 109 when power from power sources 101 is insufficient. Furthermore, depletion of storage device 107 may allow in decision step 218 for charge of storage device 107 (step 220) later at a more opportune time when the power from power sources 101 may have an increased power output. The opportune time when power from power sources 101 have an increased power output may also coincide to include supply of power to load 109 in step 222. The increased power may then be used to storage device 107 with either constant current or constant voltage, for whichever of the two is more suitable for the type of storage device 107.

At decision step 218, if storage device 107 does not need charging, the controller carrying out decision step 208 may return to decision step 214 and consider depleting storage device 107. Depleting storage device 107 may be useful, for example, for avoiding damage to batteries. Damage to batteries may be avoided for example, by charging when the SOC of the battery is in the vicinity below percentage charge L % as opposed to charging when the SOC is somewhere in between percentage charge H % and percentage charge L %.

Reference is now made to FIG. 2E, which shows further details of decision step 208 shown in FIG. 2C, according to one or more illustrative embodiments. Decision step 208 may be executed during a daytime operation mode when the amount of power from power sources 101 is above a minimum threshold level of power, and power supply to load 109 and/or storage device 107 may be from power sources 101 (step 222). At step 224, a signal may be sent to power modules 103/103P. Various types of the signals may exist. The signal may be a signal sent to power modules 103/103P to possibly serve the function of instructing the power modules 103/103P to shut down completely, perhaps due to a safety condition in power system 100, 100a, 100b, 100c, 100d and 100e. The signal may be a signal sent to power modules 103/103P to possibly serve the function of instructing the power modules 103/103P to reduce power (e.g. by an explicit message or a lack of a signal) in order to shed power. The signal may be a signal sent to power modules 103/103P to possibly serve the function of instructing the power modules 103/103P to let the power modules 103/103P to continue to control power at the present level, or to increase power to load 109 and/or storage device 107. A first signal sent to power modules 103 from central controller 185 may cause no adjustment of the power conversion of modules 103/103P from input to output of power modules 103/103P. A second signal may cause a percentage (%) change in the adjustment of the power conversion from input to output of modules 103/103P. Power output of power sources 101 may be measured in step 200 from sensors 125a, 125b and 125c in respective power modules 103/103P.

At decision step 226, if power from power sources 101 is not sufficient to power load 109, which may be indicative of, e.g. dusk, nighttime excessive shading of PV generators or reduction of wind, power system 100a-d may return to start mode status (step 210 of FIG. 2C).

At decision step 228, if power from power sources 101 is sufficient to power load 109 then supply of power to load 109 may continue in step 222 and the first signal may be sent to power modules 103/103P in step 224.

If at decision step 228, power from power sources 101 is more than sufficient to power load 109, then control of power to load 109 may continue in step 222 and a second signal may be sent to power modules 103 in step 224. The second signal sent to power modules 103/103P in step 224 therefore, may allow reduction of power supplied to load 109 if too much power is available.

Supply of power to load 109 in steps 222 and/or 216, as part of decision step 208, may take into account a load profile stored in memory device 123. A load profile may include an information update via communication interfaces 129 that may include local weather information such as current and forecasted temperature, cloud cover and amount of sunlight for example. The load profile may also include updated information with regards to an updatable load demand history of a power system 100a-d with reference to daily and nightly demand, weekday demand and monthly demand for example.

Figure 3A:
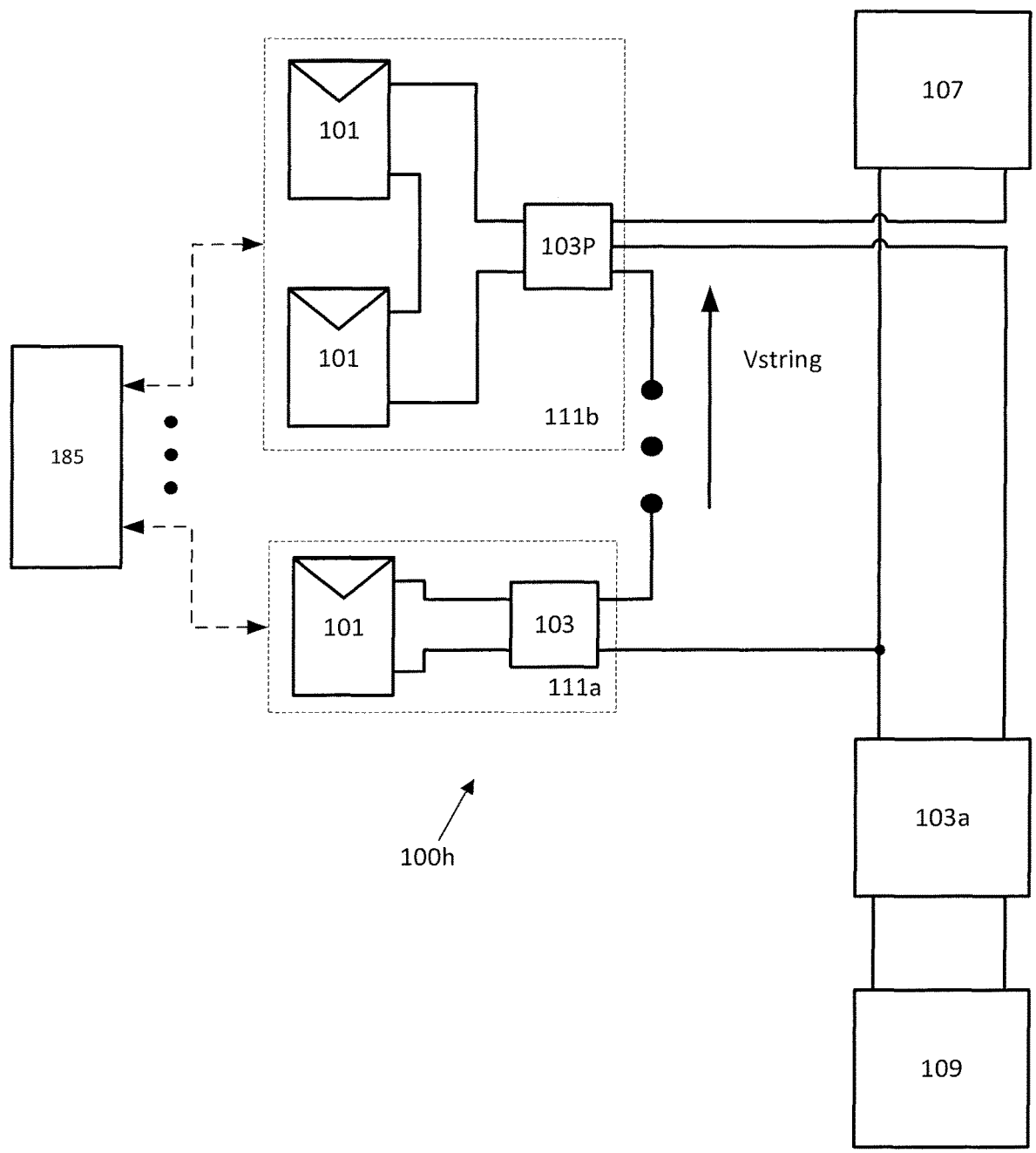
FIGS. 3A and 3B show power systems, according to a feature of one or more illustrative embodiments.

Reference is now made to FIG. 3A, which shows a power system 100h, according to one or more illustrative embodiments. Power system 100h may be similar to power system 100b shown in FIG. 1J with an additional power module 103a. A negative output terminal of power module 103 in connection configuration 111a may be connected in common with the negative input terminals of load 109, storage device 107 and power module 103a. A positive output terminal of power module 103a may connect to a positive input terminal of load 109. A positive output terminal of power module 103 in connection configuration 111a may come from a positive output terminal of power circuit 135 or from the positive output terminal of power circuit 135 through switch SW2. A positive output terminal of power module 103P may connect to the positive input terminal of power module 103a. The positive output terminal of power module 103 that is coupled to switch SW2 may connect to the positive input terminal of storage device 107. Voltage from series connected power modules 103/103P outputs is shown as Vstring which is the voltage applied to storage device 107 and the input of power module 103a. Central controller 185 may be operatively attached to power module 103a and power modules 103/103P.

Reference is now made again to method 201 and in particular to further details of decision step 208 shown in FIG. 2E with respect to power system 100h shown in FIG. 3A, according to one or more illustrative embodiments. The description that follows may be suitable for operation when the amount of power produced by power sources 101 is above the minimum threshold level of power and power supply of power to load 109 and/or storage device 107 (e.g., when power sources 101 are PV generators, during daytime operation).

In step 222 supply of power to load 109 may be via power module 103a. Voltage Vstring, from series connected power modules 103/103P outputs may be connected across the input of power module 103a as previously described in FIG. 3A. Power module 103a for example may be utilized in a situation where the voltage required by load 109 is less than voltage Vstring. When different voltage supply values are desired for multiple loads 109, multiple power modules 103a may be used for the multiple loads 109. For example, if a load 109 requires a 12-volt supply, power module 103a may be configured and/or operated to provide the 12-volts required by load 109. The 12-volts required by load 109 may be provided by use of power module 103a to convert power (voltage [Vstring]×current) provided from the series connected power modules 103 outputs connected across the input of power module 103a. In another example of step 222, if storage device 107 is a 48-volt lead acid battery, then power modules 103 may be configured and/or operated to supply a constant voltage of 50 volts in order to charge the battery. Alternatively, if storage device 107 is a 48-volt nickel based battery, then power modules 103 may be configured and/or operated to supply a constant current to charge the battery. The provision of power module 103a may enable the option to provide appropriate power to storage device 107 and/or correct voltage to loads 109 via power modules 103a.

In step 224, the first and second signals and may be sent to power modules 103/103a. Power output of power sources 101 may be measured in step 200 using sensor units 125, 125a, 125b and 125c. At decision step 226, if power from power sources 101 is not sufficient to power load 109, which may be indicative of dusk, nighttime or excessive shading of PV generators, power system 100h may return to start mode status (step 210).

At decision step 228 if power from power sources 101 is sufficient to power load 109 then supply of power to load 109 may continue in step 222 and first signal may be sent to power modules 103/103a in step 224. A maximum power point tracking (MPPT) circuit 138 utilized in power modules 103/103a under control of controller 105 or central controller 185 may be utilized to increase power extraction from power sources 101 or to control voltage and/or current supplied to load 109 and storage device 107 to increase efficiency of or avoid damage to load 109 and/or storage device 107. Control of voltage and/or current to load 109 and storage device 107 therefore, may not necessarily utilize the feature of increasing power drawn from power sources 101 but rather may utilize MPPT circuit 138 to be at a reduced power point in order to shed power produced by power sources 101. A second signal may be sent to power modules 103/103a in step 224 and may allow reduction of power supplied to load 109 if too much power is available.

Figure 3B:
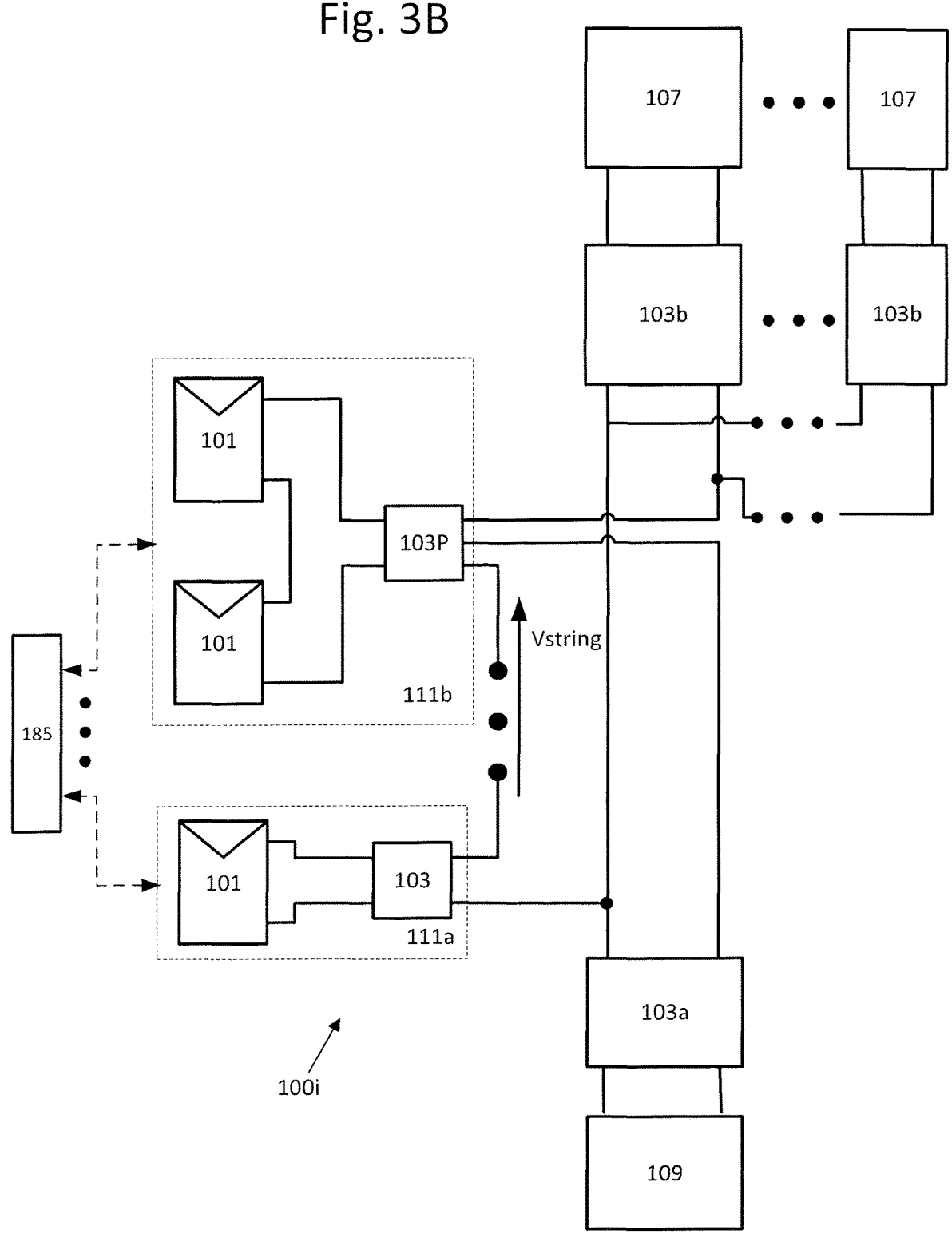

Reference is now made to FIG. 3B, which shows a power system 100i, according to one or more illustrative embodiments. Power system 100i may be similar to power system 100k shown in FIG. 3A with additional power modules 103b. Shown are multiple storage devices 107 with inputs connected to respective power modules 103b. Storage devices 107 may be all the same type or may include various different types of batteries for example. A feature of power modules 103b according to certain aspect may be that power modules 103b may convert power bi-directionally. A first direction of power conversion by power module 103b may be when multiple storage devices 107 are sourced with converted power from power modules 103/103P. Storage devices 107 may receive converted power from power modules 103/103P when storage devices 107 are being charged, for example. A second direction of power conversion may be when power from storage devices 107 is converted by power module 103b to be supplied to load 109 and/or power module 103a connected to load 109. Central controller 185 may be operatively attached to power module 103a and power modules 103b. The signals sent to power modules 103a/103b may serve the function of instructing the power modules 103a/103b to shut down completely, perhaps due to a safety condition in power systems 100h and 100i, to reduce power (e.g., an explicit message or lack of a signal) in order to shed power, to let the power modules 103a/103b to continue to control power at the present level or to increase power to load 109 and/or storage device 107 respectively.

Reference is now made again to method 201 and in particular to further detail of decision step 208 shown in FIG. 2D with respect to power system 100i shown in FIG. 3B, according to one or more illustrative embodiments. The description that follows may concern both the charge and discharge of multiple storage devices 107 shown in FIG. 3B. Power system 100i may include additional power modules 103b connected respectively to the terminals of storage devices 107. As described previously with regard to FIG. 3B, power modules 103b may convert power bi-directionally in order to charge or discharge storage devices 107. MPPT circuits 138 in power modules 103/103P may improve power transfer to storage devices 107 and/or load 109. By way of example in the description which follows, in order to simplify the description, two of the same type of storage devices 107 are used with respective power modules 103b. However, multiple storage devices 107 may be utilized as well as different types of storage devices 107.

In decision step 214, depletion of storage device may take place mainly during start mode in step 210 of power system 100i. At start mode in step 210, storage devices 107 may supply load 109 with DC power. Being in or entering into start mode in step 210 may be indicative of dusk, dawn or excessive shading of PV generators of power system 100. Supply of DC power to load 109 from storage devices 107, when the amount of power from power sources 101 is below a minimum threshold level of power, may be such that a first storage device 107 having the most charge remains charged while a second storage device 107 having less charge is designated to be depleted. In general, for any storage device 107 with less charge than another storage device 107 designated for depletion and subsequent charging cycle may be done to mitigate damage to storage devices for example. The option may remain in decision step 214 however, to deplete either the first storage device 107 or the second storage device 107 with the condition that at least one storage device 107 is left mostly charged at any point in time.

When transitioning out of start mode at step 210, the amount of power from power sources 101 (measured in step 200) may be above a minimum threshold level of power. State of charge (SOC) of storage devices 107 may be measured in step 204 with sensor unit 125. Second storage device 107 designated for depletion in decision step 214 along with the power from power sources 101 may be utilized to supply a supplemental power to load 109 (step 216). The supplemental power provided to load 109 from second storage device 107 may extend the provision of power to load 109 when power from power sources 101 is insufficient to fully supply load 109 (e.g., at dusk or dawn).

Depletion of second storage device 107 may allow in decision step 218 for charge of second storage device 107 (step 220) later in the daytime at a more opportune time when the power from power sources 101 may have an increased power output. The opportune time when power from power sources 101 have an increased power output may also coincide with the supply of power to load 109 in step 222. The increased power may then also be used to charge second storage device 107 rather than the first storage device 107.

Reference is now made to FIG. 4A, which shows a block diagram 450, according to one or more illustrative embodiments. Power modules 103/103P/103a/103b may connect to power sources 101, storage devices 107, loads 109 and central controller 185 as previously discussed above. Power modules 103/103P/103a/103b according to previous descriptions may also take into consideration a number of possible options available for power modules 103/103P/103a/103b and their control by central controller 185. With respect to the control of power modules 103/103P/103a/103b, signals 452, 454, 456 and 458 may be sent by central controller 185 to shut down, to reduce present level of power output, to maintain present level of power output and to increase present level of power output respectively of power modules 103/103P/103a/103b. Three potential supplies of power are shown as P1, P2 and P3. The direction of conversion by power modules 103/103P/103a/103b of power from power sources 101 and direction of supply of powers P1, P2 and P3 are indicated by dashed lines with arrows. Power modules 103/103P/103a/103b under the control of central controller 185 may provide power P1 to loads 109 and/or power P2 to storage devices 107 or storage devices 107 may provide power P3 to loads 109. At any point in time a potential amount of power Pap may be given by the following:

$$Pap=P1+P2+P3+Pshed$$

Where the power Pshed is the amount of power currently being shed owing to control of voltage and/or current to loads 109 and storage devices 107, which may not necessarily utilize the feature of increasing power from power sources 101 to loads 109 and/or storage devices 107 via signal 458, but rather to utilize MPPT circuits 138 in power modules 103/103P/103a/103b to operate via signal 454 at a point in order to shed some of the power produced by power sources 101.

The description which follows is with reference to FIG. 4B, which is a flow chart describing a method 401 for block diagram 450, according to one or more illustrative embodiments. By way of non-limiting example power systems 100, 100a-100i previously discussed in a context of photovoltaic systems where power sources 101 are photovoltaic panels. The context may include four modes of operation: 1. daytime operation, 2. dusk operation, 3. dawn operation 4. And nighttime operation. In the descriptions that follow, supply and control of powers P1, P2 and P3 based on certain priorities may be performed by central controller 185 via signals 452, 454, 456 and 458 selected and sent to power modules 103/103P/103a/103b.

1. Daytime Operation:

During daytime operation, it may be assumed in general that sufficient sunlight is available to generate power from power sources 101. In step 400/200, power of power sources 101 and/or power at the terminals of power modules 103/103P/103a/103b may be measured and conveyed to central controller 185 via sensor units 125, 125a, 125b and 125c. Similarly, in step 402/204 the state of charge (SOC) of storage devices 107 may also be measured via sensor units 125, 125a, 125b and 125c.

If in decision step 404/202 sufficient generated power is available from power sources 101, power P1 may be provided to loads 109 in step 408. Power P2 may be supplied to storage devices 107 (step 410) if in decision step 406 the state of charge (SOC) of storage devices 107 is low. If the state of charge (SOC) of storage devices 107 in decision step 406 is high, power P1 may be provided to loads 109 in step 408.

Decision step 404/202 may further be explained in terms of how powers P1 and P2 may be supplied and controlled to respective loads 109 and storage devices 107 in the descriptions that follow.

With respect to power P2; power supplied to each storage device 107 (step 410) may be based on priorities assigned to each storage device 107. Power P2 may be converted power of power sources 101 via power modules power modules 103/103P/103a/103b. Fixed, changeable and updateable priorities may be assigned to each storage device 107. For example, a fixed priority may be when a storage device 107 in a group of storage devices 107 may be designated as an emergency storage device 107 for a particular load 109 such that the control of charge and discharge of the emergency storage always takes precedence over other storage devices 107.

Priorities assigned to each storage device 107 may be further based on the current state of charge (SOC) of a storage device 107, such that storage devices 107 are not damaged by overcharging or from over depletion: for example, damage to storage devices 107 (batteries) may be avoided for example with reference to FIGS. 2A and 2B; when a battery is not charged if its SOC is substantially around percentage charge H %, or charging when the SOC 212 of the battery is in the vicinity below percentage charge L % as opposed to charging when the SOC is somewhere in between percentage charge H % and percentage charge L %.

Priorities assigned to each storage device 107 may further based on the required charging parameter such as the control and use of power modules 103b as shown in FIG. 3B to provide constant voltage or current for a certain time period at a particular voltage or current to charge a battery for example. As such different battery types, or different storage devices 107 may be accommodated and controlled by central controller 185 via use of signals 452, 454, 456 and 458.

Priorities assigned to each storage device 107 may further based on the possible requirement to discharge a particular storage device 107 before charging in order to avoid damage to a battery and/or where the discharge of a particular storage device 107 before charging may provide the benefit of supplementing power P1 to loads 109 via power modules 103b when power P1 is not sufficient, for example.

Priorities assigned to each storage device 107 may further based on anticipated night time demand in order to supply power P3 to loads 109, where the bi-directional control of power module 103b for example is utilized to provide power P3 to load 109 and/or power modules 103a attached to loads 109.

Priorities assigned to each storage device 107 may further based on current weather conditions which may include information such as temperature or the amount of daylight time remaining. As such, central controller 185, may decide which storage devices 107 in a group of storage devices to charge or discharge, for example.

Priorities assigned to each storage device 107 may further based on if any undue shedding of power (Pshed) is presently going on with respect to power supply of power P1 to loads 109 (step 408) which may be diverted and/or added to the supply of P2 to storage devices 107.

With respect to power P1, power supplied to loads 109 (step 408) may be based on priorities assigned to each load 109. Power P1 may be converted power of power sources 101 via power modules power modules 103/103P/103a/103b. Fixed, changeable and updateable priorities assigned to each load 109 may be based on, for example, an updatable load demand history of the power system with reference to daily or nightly demand, weekday demand and monthly demand. The load demand history may be compared with the present load demand such that more loads 109 may be supplied by power P1 and/or more power P2 may be utilized in charging storage devices 107. Alternatively, if the current load demand is higher, power to loads 109 may be supplemented by P3 by the discharge of some of storage devices 107. The load demand history may further take into consideration current weather conditions, temperature or the amount of daylight time remaining.

With respect to power P1; power supplied to which loads 109 may be based also on if there is any undue charging of storage devices 107 that may be presently going on with respect to possible insufficient supply of power P1 to loads 109 (step 408). In that case, the power unduly supplied to storage devices 107 may be diverted and/or added to the supply of P1 to loads 109. Power supplied to which loads 109 may be further based on the possible requirement to discharge a particular storage device 107 into a load 109 before charging the particular storage device 107.

With regard supply and control of powers P1 and P2 to respective loads 109 and storage devices 107, referring back again to FIG. 1D, power module 103P may have a number of positive outputs from a single positive output of power circuit 135. The number of positive outputs may provide the option to select via switch SW2 when OFF to provide power to load 109 or with switch SW2 when ON to provide power to load 109 and storage device 107 for example. More switches may be utilized with the single positive output of power circuit 135 to provide multiple outputs to multiple respective loads 109 and/or storage devices 107. The multiple outputs may be selected based on the priorities stated above so that a particular load 109 and/or storage device 107 may receive the appropriate supply of respective powers P1 and P2 under control of central controller 185 which may include the appropriate signals 452, 454, 456 and 458 to power modules 103/103P/103a/103b. With respect to the receipt of the appropriate supply of respective powers P1 and P2, power circuit 135 may further include multiple power circuits 135 each sharing a common input from power source 101 and to provide multiple voltage level outputs and/or current level outputs in accordance with different voltage and current demands of loads 109 and/or storage devices 107. The multiple voltage level outputs and/or current level outputs may also be selected by respective multiple switches. The selection by multiple switches may allow a particular load 109/storage device 107 in a group of loads 109/storage devices 107 to receive power supply P1 and/or P2 from the control of power modules 103/103P/103a/103b via signals 452, 454, 456 and 458 in order to provide a specific voltage and/or current demand for example.

In some embodiments, control of powers P1 and P2 and supply of power P1 and P2 to respective loads 109 and storage devices 107 may be controlled by power line communication via encoded signals to power modules 103/103P/103a/103b. The encoded signals to power modules 103/103P/103a/103b may be an instruction to be either ON or OFF in terms of a power module either converting or not converting power from the power module input to the power module output. The instruction to be either ON or OFF sent to various power modules 103/103P/103a/103b may be so that a particular load 109 and/or storage device 107 may receive an appropriate supply of respective powers P1 and P2 under control of central controller 185 that may also include the appropriate signals 452, 454, 456 and 458 to power modules 103/103P/103a/103b.

2. Dusk Operation and/or 3. Dawn Operation.

If in decision step 404/202 sufficient generated power is not available from power sources 101 when PV panels are heavily shaded in daytime mode or it is dusk or dawn and the SOC of storage devices 107 is also low in decision step 412, a danger alert may be issued in step 416. Supply of power to a priority load which is designated as an emergency load may be supplied from a storage device 107 which is designated as an emergency storage device 107 also in step 416. Otherwise in decision step 412 powers P1 and P3 may be supplied to loads 109 (step 414) according to their priority as discussed above.

4. Nighttime Operation

In nighttime operation, power might not be generated if power sources 101 are PV panels. In some embodiments, power sources 101 may instead be DC supplied from a wind turbine or possibly a petrol generator and/or additionally include PV panels. If the SOC of storage devices 107 is also low in decision step 412, a danger alert may be issued in step 416. Supply of power to a priority load that is designated as an emergency load may be supplied from a storage device 107 that is designated as an emergency storage device 107 at step 416. Otherwise, at decision step 412 powers P1 (from the wind turbine or the petrol generator) and P3 from storage devices 107 may be supplied to loads 109 (step 414) according to their priority as discussed above. If power sources 101 are PV panels, then P3 from storage devices 107 may be supplied to loads 109 in step 414 according to their priority as discussed above.

Reference is made to FIG. 5, which shows a graphical user interface (GUI) 550, according to one or more illustrative embodiments. Areas 50, 51, 52, 53, 54 and 55 may be included on one graphical screen or be displayed on different graphical screens (e.g. depending on the screen size available). In the description that follows, a touch screen is referenced by way of example, but other screens such as computer monitors, laptop screens or smart phone screens may be used where items may be selected for example by mouse and/or pointer.

GUI 550 may include a text area 50 which may give a user information as to the location of power system 100, 100a-100i for example, the local time and date, an indication as to the weather conditions at the location, temperature at the location and the wind speed at the location of a power system 100, 100a-100i. Text area 50 may also serve overall as an icon that when touched or swiped by the user using a touch screen device such as a smart phone, allows a sub menu to appear. The sub menu may, for example, allow the user to view another DC power station located elsewhere to be monitored by the user.

GUI 550 may include a stage of charge (SOC) area 51 that shows the percentage (%) SOC of three storage devices 107 which may be used in power systems 100, 100a-100i. The percentage (%) SOC of the three storage devices 107 is shown by respective cross hatchings. Each of the percentage (%) SOC of the three storage devices 107 displayed may also serve overall as separate icons which when touched or swiped by the user allows shows a further detail about a particular storage device 107. Using the example of a battery for storage device 107, the further details may include information of battery type, rating in terms of voltage, current and ampere hours (Ah), location of the battery, the number of times the battery has been charged/discharged, the projected battery life of a battery based on its usage. The further details may also provide a remote means for a configuration and a control of the three storage devices 107 via respective power modules 103b for example. The configuration may include the option to disconnect and/or not use a particular battery, the option to designate a battery to have greater priority over the other batteries to be charged first for example, to schedule a battery for replacement based on its current usage, the option to change parameters of a charge profile for a battery or to allow an upload and/or update of a charge profile for a battery.

GUI 550 may include a load utilization area 52 that shows four loads 109 and indicates to a user of the amount of power, voltage and current a load 109 is presently consuming. Each of the four loads 109 displayed may also serve overall as separate icons which when touched or swiped by the user allows shows a further detail about a particular load 109. The detail about a load 109 may include, for example, a load profile for a particular load 109. The load profile may also include updated information with regards to an updatable load demand history of the power system with reference to daily and nightly demand, weekday demand and monthly demand. The load profile may be updated and/or be configurable via load utilization area 52 in order control power delivery to loads 109. Options may be provided to possibly disconnect load 109 or to change the voltage and/or currents supplied to load 109 by providing access and control of power modules 103a that may be attached to respective loads 109.

GUI 550 may further include DC generation area 53, which shows five power outputs from power sources 101 connected to power modules 103P/103. If the outputs of power modules 103P/103 are connected in series to form a string as described in FIGS. 3A and 3B for example, then the voltage of the string (Vstring) may be displayed also in DC generation area 53. Each of the five powers displayed may also serve overall as separate icons that, when touched or swiped by the user, shows a further detail about a particular power source 101 and respective power modules 103P/103. The further detail for example may include the voltages and currents sensed by sensor unit 125, so as to indicate the voltages and currents on respective inputs and outputs of power modules 103P/103, for example. Based on the further details, a user may be given the option to remotely switch off or perhaps bypass a particular power module 103P/103 output. Related to DC generation area 53 is power utilization area 54 which indicates the total power (Pgen) currently being generated and the amount of power currently being shed (Pshed). Power may be shed since loads 109 and storage devices 107 may not need so much of the power currently being produced.

GUI 550 may further include a graphical display area 55 to display useful graphs to the user. A graph is shown of power usage versus the time of day. The anticipated power consumption 500 is displayed as a solid line and the actual real time or near real time power consumption 502 is displayed as a dotted line. Graphical display area 55 may also serve overall as an icon which, when touched or swiped by the user, allows the user to select from different sub menus different graphical displays of different parameters of a power system or the topographical layout of power sources 101 in the power system for example. The remote configurations described for GUI 550 which include in particular the supply and control of powers P1 to loads 109 and P2 storage device 107 and/or power P3 from storage device 107 to loads 109 may be provided dynamically via GUI 550 rather than as the result of something that is statically predefined. The supply and control of powers P1 to loads 109 and P2 storage device 107 and/or power P3 from storage device 107 to loads 109 may be provided dynamically and/or statically predefined, according to the priorities described in further detail with respect to FIGS. 4A and 4B.

According to some illustrative embodiments, a power source with direct current (DC) output terminals is connected to the input terminals of a DC power module, in which the DC power module includes first and second positive DC output terminals respectively connected to positive DC input terminals of a load and a storage device. The first and second positive DC outputs of the power module may be utilized so that power from DC power module may be supplied to the load only, or to the load and to the storage device.

According to some illustrative embodiments, a switch is provided bet e output of a power source and an input of a DC power module, in which the switch receives a signal to disconnect the output of the power source from the put of the DC power module when an unsafe condition is detected. The unsafe condition may be detected by one or more sensors that are capable of sensing parameters such as power, current, voltage, and temperature at respective locations of a DC power generation system that includes the power source and the DC power module.

According to some illustrative embodiments, DC power sources are connected to a load and/or a storage device via multiple power modules. The power modules may control power such that the load and/or the storage device may match the DC power from the DC power sources, in which power may be shed from the load and/or the storage device. Optionally, DC power from the storage device may be matched and supplied to the load, or optionally DC power from the DC power sources may be matched and supplied to the load. To control power, the power modules may include sensors capable of sensing parameters such as powers, currents, voltages, coulombs, and temperatures of their respective inputs and outputs.

According to some illustrative embodiments, the state of charge of a storage device may be sensed. Upon the sensed charge of the storage device being above a first predetermined level of state of charge, the power stored in the storage device may be supplied to a load, whereby the stored charge of the storage device is discharged to the load. Upon the sensed charge of the storage device being below a second predetermined level of state of charge, the storage device may then be charged and power to the load may be supplied responsive to the measured power.

According to some illustrative embodiments, a power circuit may be connected at its output to a load and to a storage device. A switch may be provided at an output terminal of the power circuit, to enable connection or disconnection between the output terminal of the power circuit and an input terminal of the storage device. With the switch in an ON position, the load and the storage device are connected in parallel across an output terminal of the power circuit. With the switch in an OFF position, the load remains connected across the output terminal of the power circuit, and the storage device is disconnected from the output terminal of the power circuit. In the context of a photovoltaic (PV) panel implementation of a power system, operation of the switch in the ON position may allow power to be supplied to the load and to the storage device when power from a power source (e.g., solar panel) providing power to the power circuit is sufficient (e.g., during the daytime). Operation of the switch in an OFF position may allow power to be supplied to the load if charging of the storage device is to be avoided, such as when the storage device is already substantially fully charged, or to reduce the number of charging cycles of the storage device, or when power from the power source supplying power to the power circuit is insufficient to both power the load and the charge the storage device. When power from the power source is insufficient (e.g., during the nighttime), the switch may be placed in the ON position, allowing power from the storage device to be applied to the load.

According to some illustrative embodiments, a direct current (DC) system may be utilized to supply DC power to a load and/or a storage device. The DC system may include various interconnections of groups of DC power sources that also may be connected in various series, parallel, series parallel and parallel series combinations for example.

According to some illustrative embodiments, the groups of DC power sources may include groups of DC power sources where the direct current to supply a load and/or a storage device may be derived from renewable energy sources such as sunlight, wind, rain, tides, waves, and geothermal heat. Devices that convert these renewable energy sources include for example photovoltaic solar generators, wind generators and wind turbines. The groups of DC power sources may also include groups of DC power sources where the direct current is derived from non-renewable energy sources. Devices that convert these non-renewable energy sources into DC power to supply a load and/or a storage device may include petrol, oil and gas generators and/or turbines for example. The direct current may also be derived from rectified or converted sources of alternating current provided from a switched mode power supply, dynamo or alternator for example.

According to some illustrative embodiments, DC power sources in a DC power system are interconnected to various groups of DC sources. Each group of DC sources may contain different types of DC power derived from both renewable and non-renewable energy sources, so that the DC power generated may be configured to meet the criteria of providing an uninterruptable source of DC power to a load from the DC power sources and/or to store some of the DC power in a storage device. A part of the criteria may be to utilize energy previously stored in the storage device to subsequently supply power and what might be considered to be emergency power to the load when the DC sources are not able to produce power owing to lack of sunlight, wind and/or fuel for example.

According to some illustrative embodiments, DC power sources may include a connection of DC sources to a load and/or storage device via multiple power modules. The power modules may control power such that the load and/or storage may match the DC power from the DC power sources, power may be shed from the load and/or storage, optionally DC power from storage device may be matched and supplied to the load or optionally DC power from the DC power sources may be matched and supplied to the load. To control power, the power modules may include the capability of sensing parameters such as powers, currents, voltages, coulombs, temperatures of their respective inputs and outputs via sensors to a controller.

According to some illustrative embodiments, the power modules may control power to the load and/or storage device according to a load profile. The load profile may include an information update via communication interfaces included in the power modules that communicate with each other to receive weather information such as present and forecasted temperature, wind speed, cloud cover and amount of sunlight for example. The load profile may also include updated information with regards to an updatable load demand history of the power system with reference to daily and nightly demand, weekday demand and monthly demand. The updatable load demand history of the power system may also take into account the amount of fuel and cost of fuel available to utilize petrol, oil and gas generators and/or turbines instead of utilizing other types of DC power provision for example.

According to some illustrative embodiments, the power modules may control power to the load and/or storage device according to a charge profile of a storage device. Using the example of a battery for the storage device, the charge profile may ensure optimal charging of the battery that may prefer a constant voltage level or constant current for at least a minimum period of time. The charge profile may also specify control of the temperature of the battery during charging which may improve the performance and/or reliability of the battery, since the battery may need to stay cool when being charged so as to ensure optimal charging.

According to some illustrative embodiments, consideration may be given to different types of batteries when charging and discharging to ensure that correct voltages, currents, temperatures and appropriate time periods of charge and discharge are monitored, controlled and applied to batteries so as to avoid damage to the batteries. In addition, the charge profile may include reconfiguration of the charge profile based on data of the transfer of charge and/or discharge of a battery in order to access the ageing and use of batteries. Such data logging may then be used to provide an estimate of projected battery life and timing of battery maintenance and replacement for example.

According to some illustrative embodiments, the power modules may be configurable to control the delivery of power of the DC sources to a load and/or a storage device. The power modules may be configurable to control the delivery of power to a load from energy previously stored in the storage device. The power modules may be configurable to control the delivery of power to a load from both the DC power sources and the storage device together.

According to some illustrative embodiments, a method for a direct current (DC) power system that may include a controller, multiple DC power sources, multiple DC power modules, multiple bi-directional power modules and multiple storage devices. In the method, each of the power sources may be coupled to a respective DC power module. The power modules outputs may be coupled in a connection that may be a series connection of the power modules outputs, to form thereby, a serial string of power module outputs. The connection may also be a parallel connection of the power modules outputs. The serial string or the parallel connection may be coupled to a load and may be also coupled to the bi-directional power modules. Each of the bi-directional power modules may be coupled to respective storage devices. Power of each of the power sources may be measured by sensors provided with each of the power modules.

According to some illustrative embodiments, upon the power being measured, a signal may be transmitted to the power module and/or the bi-directional power modules. The signal sent to power modules may serve the function of instructing the power modules to shut down completely (e.g., using an explicit message) due, for example, to a safety condition in the power system, to reduce power (e.g., an explicit message or lack of a signal) in order to shed power, to let the power modules to continue to control power at the present level or to increase power to a load and/or storage device. In general, the supply of power to the load and/or storage device may be controlled responsive to the power measured. The load may comprise multiple loads, and multiple DC power modules may be respectively coupled between the serial string and the loads so that loads with different voltage levels and current requirements may be accommodated. Similarly, different types of storage devices may also include respective bi-direction power modules so as to accommodate the different voltage levels and current level requirements such as constant voltage or constant current for charging the storage device for example. The bi-directional nature of the power modules of respective storage devices also allow the accommodation and provision of the different voltage levels and current level requirements of the multiple loads, when power to the loads is provided from the storage devices.

According to some illustrative embodiments, the control of power supplied to the load may further include at least one of the storage devices to be depleted prior to subsequent charging of the at least one storage device, thereby mitigating damage to the at least one storage device. The at least one storage device depleted may additionally demand that at least one of the other the storage devices remains substantially charged so that it may be used in an emergency situation for example or to satisfy a requirement that a minimal amount energy is always available to be supplied.

According to some illustrative embodiments, with respect to the control of power supplied to the load, the state of charge of the storage devices may be sensed. Upon the sensed charge of the storage devices being above a second predetermined level of state of charge, the power from the storage devices may be supplied to the load, thereby the stored charges of the storage devices are discharged to the load. Upon the sensed charge of the storage devices being below the second predetermined level of state of charge and the power measured being above the predetermined level, the storage devices may then be charged and power to the load may be supplied responsive to the measured power.

According to some illustrative embodiments, the discharge of the storage devices may leave one of the storage devices substantially fully charged and the charge of the storage devices may be performed on the storage devices t have been discharged to a previously defined state of minimal charge.

According to some illustrative embodiments, a DC power system may include a power source with a first output terminal, and a power module having a first input terminal and a second output terminal. The first input terminal of the power module may be connected to the first output terminal of the power source. The DC power system may further include a storage device having a second input terminal connected to the second output terminal of the power module, and a load having a third input terminal connected to the second output terminal of the power module.

According to some illustrative embodiments, the power module may further include a controller operatively connected to a memory. A sensor unit may be operatively connected to the controller and the controller may be configured to sense an electrical parameter on the first input terminal, the second output terminal, the second input terminal or the third terminal. A power circuit may be configured to provide and control a power on the second output terminal of the power module responsive to the sensed electrical parameter.

According to some illustrative embodiments, the DC power system may still further include a second power module having a fourth input terminal and a third output terminal. The fourth input terminal may be connected between the second output terminal of the power module and the third input terminal of the load. The DC power system may also include a third power module having a fifth input terminal and a fourth output terminal. The fifth input terminal of the third power module may be connected between the second output terminal and the second input terminal of the storage device. The third power module may be configured to convert power from the fifth input to the second input terminal of the storage device or to convert power from the second input terminal of the storage device to the second output terminal.

According to some illustrative embodiments, the DC power system may further include a switch disposed between the second output terminal and the first input terminal of the power module. The switch may be operated responsive to the electrical parameter sensed and the state of charge of the storage device. A second switch may be disposed between the first output terminal of the power source and the first input terminal of the power module.

According to some illustrative embodiments, a central controller may be operatively connected to the power module. The power circuit may be configured by the central controller to provide and control a power on the second output terminal of the power module responsive to the sensed electrical parameter. The electrical parameter sensed may be voltage, current, resistance, coulombs and power. The power circuit may be a buck circuit, a boost circuit, a buck/boost circuit or a buck+boost circuit. All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

It is noted that various connections are set forth between elements herein. These connections are described in general and, unless specified otherwise, may be direct or indirect; this specification is not intended to be limiting in this respect. Further, although elements herein are described in terms of either hardware or software, they may be implemented in either hardware and/or software. Additionally, elements of one embodiment may be combined with elements from other embodiments in appropriate combinations or sub-combinations. For example, the switch(s), sensor(s), power source(s), storage element(s), and interconnections of one embodiment may be combined with similar elements of another embodiment and used in any combination or sub-combination. Also, for example, power module 103P shown in FIGS. 1A, 1F, 1G, 1H, 1J, 3A and 3B may be replaced by power module 103 that has a single positive output. Storage device 107 shown in FIG. 3A may also connected to a power module 103*b* as shown in FIG. 3B. Power sources 101 shown in the Figures may be alternating current (AC) sources and power modules 103 and 103P connected thereto may serve as AC-to-DC converters such as rectifiers and/or switched mode power supply, for example. One skilled in the art will recognize that the various embodiments detailed above may be combined in suitable combinations and that portions of the embodiments may be unitized in various sub-combinations.

What is claimed is:

1. A method comprising:
   measuring, by a controller using a sensor, a first power supplied to a load from an output terminal of a power converter, wherein a power source is connected to an input terminal of the power converter, and the load is connected to the output terminal;
   determining, by the controller, a state of charge of a storage device, wherein the storage device is connected, via a switch, to the output terminal;
   based on the state of charge being below a first threshold and the first power being above a second threshold and by turning the switch on, causing a first transfer of the first power, via the output terminal, to both the load and the storage device;
   based on the state of charge being above the first threshold and the first power being below the second threshold and by turning the switch on, causing a second transfer of a stored power from the storage device to the load via the output terminal while disabling the power converter from transferring the first power; and based on the state of charge being above the first threshold and the first power being above the second threshold and by turning the switch off, causing a third transfer of the first power, via the output terminal, to the load.

2. The method of claim 1, further comprising:
measuring a second power at the input terminal of the power converter, wherein the input terminal of the power converter is connected to an output of the power source; and
sending, based on the measured second power, signals to the power converter, the signals comprising instructions for the power converter to:
shut down;
maintain a power level of the first power substantially at a power level of the second power;
reduce the power level of the first power to be below the power level of the second power; or
increase the power level of the first power to be above the power level of the second power.

3. The method of claim 1, further comprising:
based on the state of charge being below the first threshold and the first power being below the second threshold, turning the switch off and disabling the power converter from transferring the first power.

4. The method of claim 1, wherein the causing the first transfer, the second transfer, and the third transfer are further based on a load profile of the load.

5. The method of claim 1, wherein the causing of the first transfer of the first power to the storage device is further based on a charge profile of the storage device, and
wherein the charge profile comprises an indication to charge the storage device by a constant voltage or by a constant current.

6. The method of claim 1, further comprising:
controlling, based on a detection of an unsafe condition, a second switch to disconnect the power source from the power converter.

7. A method comprising:
measuring, by a controller using a sensor, a first power supplied to a load from an output terminal of a series string of power converters, wherein each power converter, of the series string of power converters, is connected to a respective power source of a plurality of power sources, and the load is connected to the output terminal;
determining, by the controller, a state of charge of a storage device, wherein the storage device is connected, via a switch, to the output terminal;
based on the state of charge being below a first threshold and the first power being above a second threshold and by turning the switch on, causing a first transfer of the first power, via the output terminal, to both the load and the storage device;
based on the state of charge being above the first threshold and the first power being below the second threshold and by turning the switch on, causing a second transfer of a stored power from the storage device to the load via the output terminal while disabling the power converters of the series string of power converters; and
based on the state of charge being above the first threshold and the first power being above the second threshold and by turning the switch off, causing a third transfer of the first power, via the output terminal, to the load.

8. The method of claim 7, further comprising:
measuring a second power at an input terminal of one power converter of the series string of power converters; and
sending, based on the measured second power, signals to the one power converter, the signals comprising instructions for the one power converter to:
shut down;
maintain an output power level, of the one power converter, substantially at a power level of the second power;
reduce the output power level to be below the power level of the second power; or
increase the output power level to be above the power level of the second power.

9. The method of claim 7, wherein the causing the first transfer, the second transfer, and the third transfer are further based on a load profile of the load.

10. The method of claim 7, wherein the output terminal of the series string is connected to the load via an additional power converter.

11. The method of claim 7, further comprising:
based on the state of charge being below the first threshold and the first power being below the second threshold, turning the switch off and disabling the power converters of the series string of power converters.

12. The method of claim 7, wherein the causing the first transfer of the first power to the storage device is further based on a charge profile of the storage device, and
wherein the charge profile comprises an indication to charge the storage device by a constant voltage or by a constant current.

13. An apparatus comprising:
a power converter comprising:
an input terminal configured to be connected to a power source; and
an output terminal configured to be connected to a load; and
a switch configured to connect the output terminal to a storage device;
a controller configured to:
receive a measurement of a first power supplied from the output terminal to the load;
receive a measurement of a state of charge of the storage device; and
based on the state of charge being below a first threshold and the first power being above a second threshold and by turning the switch on, cause a first transfer of the first power, via the output terminal, to both the load and the storage device;
based on the state of charge being above the first threshold and the first power being below the second threshold and by turning the switch on, cause a second transfer of a stored power from the storage device to the load via the output terminal while disabling the power converter from transferring the first power; and
based on the state of charge being above the first threshold and the first power being above the second threshold and by turning the switch off, cause a third transfer of the first power, via the output terminal, to the load.

14. The apparatus of claim 13, wherein the controller is further configured to:
receive a measurement for a second power at an input terminal of the power converter; and
send, based on the second power, signals to the power converter, the signals comprising instructions for the power converter to:

shut down;

maintain a power level of the first power substantially at a power level of the second power;

reduce the power level of the first power to be below the power level of the second power; or increase the power level of the first power to be above the power level of the second power.

15. The apparatus of claim 13, wherein the controller is further configured to, based on the state of charge being below the first threshold and the first power being below the second threshold, turn the switch off and disable the power converter from transferring the first power.

16. The apparatus of claim 13, wherein the controller is further configured to cause, based on a load profile of the load, the first transfer and the second transfer of the first power to the load or the second transfer of the stored power to the load.

17. The apparatus of claim 16, wherein the controller is further configured to periodically update the load profile of the load.

18. The apparatus of claim 13, wherein the controller is further configured to cause, based on a charge profile of the storage device, the first transfer of the first power to the storage device, wherein the charge profile comprises an indication to charge the storage device by a constant voltage.

19. The apparatus of claim 13, wherein the controller is further configured to cause, based on a charge profile of the storage device, the first transfer of the first power to the storage device, where the charge profile comprises an indication to charge the storage device by a constant current.

20. The apparatus of claim 13, wherein the controller is further configured to control, based on a detection of an unsafe condition, a second switch to disconnect the power source from the power converter.

* * * * *